(12) United States Patent
Green et al.

(10) Patent No.: US 8,600,028 B2
(45) Date of Patent: Dec. 3, 2013

(54) CONTEXTUAL PHONE NUMBER VALIDATION

(75) Inventors: Tammy Green, Provo, UT (US); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 1182 days.

(21) Appl. No.: 12/499,642

(22) Filed: Jul. 8, 2009

(65) Prior Publication Data

US 2011/0007887 A1      Jan. 13, 2011

(51) Int. Cl.
    *H04M 3/42*      (2006.01)
(52) U.S. Cl.
    USPC .............. 379/203.01; 379/202.01; 379/158
(58) Field of Classification Search
    USPC .......................... 379/203.01, 202.01, 158
    See application file for complete search history.

(56) References Cited

U.S. PATENT DOCUMENTS

| | | | | |
|---|---|---|---|---|
| 5,210,789 | A  * | 5/1993 | Jeffus et al. | 379/127.01 |
| 8,300,791 | B2 * | 10/2012 | O'Sullivan et al. | 379/207.13 |
| 2003/0225686 | A1* | 12/2003 | Mollett et al. | 705/38 |
| 2004/0003040 | A1* | 1/2004 | Beavers et al. | 709/204 |
| 2004/0246332 | A1* | 12/2004 | Crouch | 348/14.08 |
| 2008/0159511 | A1* | 7/2008 | Keohane et al. | 379/202.01 |
| 2008/0263648 | A1* | 10/2008 | Sathyan et al. | 726/7 |
| 2010/0223389 | A1* | 9/2010 | Ananthanarayanan et al. | 709/229 |

OTHER PUBLICATIONS

SmartWebby (2001). "Javascript Phone Number Validation." Retrieved from http://www.smartwebby.com/DHTML/phone_no_validation.asp.
Accudata Technologies (2003). "Telephone Number Validation Services." Retrieved from http://www.accudatatech.com/lidb-validation.html.
Demo Source and Support (2003). "Phone No. Validation." Retrieved from hftp://www.java2s.com/Code/JavaScript/Form-Control/PhoneNumberValidation.htm.
Roshan Bhattarai's Blog (2008). "USA's Phone Number Validation Using Regular Expression in PHP." Retrieved from http://roshanbh.com.np/2008/02/phone-number-validation-php.html.

* cited by examiner

*Primary Examiner* — William Deane, Jr.
(74) *Attorney, Agent, or Firm* — Marger Johnson & McCollom PC

(57) ABSTRACT

A validation service offers the ability to validate a telephone conference. The validation service can verify that a telephone number and a pass code can be used to access the telephone conference at the time the telephone conference is scheduled. The validation service can also inform users about changes to the scheduled telephone conference, and provide alternative telephone numbers that can be used to access the telephone conference.

22 Claims, 27 Drawing Sheets

510

1010
- From: Dave
- To: John
- Cc: Jane, Richard
- Subject: ABC Strategic Planning Telecon
- Date: May 1, 2009
- Time: 10:00 am MDT 1005
- Phone: 801-555-1234
- Pass Code: 1234567#

Hi, John.
Our telecon is scheduled for 10:00 am tomorrow. To access the telecon, dial 801-555-1234, pass code 1234567#. Jane and Richard will also be joining us.

Dave

FIG. 10

CONTEXTUAL PHONE NUMBER VALIDATION

FIELD OF THE INVENTION

This invention pertains to telephone conferences, and more particularly to validating that the information for the telephone conference can be used to access the telephone conference.

BACKGROUND OF THE INVENTION

For projects that require more than one person to complete, the multiple participants often need to meet to achieve the aims of the project. Where the participants are all closely located geographically, the participants can meet at some agreed-upon place to hold the conference. But if the participants are not closely located geographically, it can be difficult for the participants to physically meet somewhere. At least one participant would have to travel to the meeting site. Depending on how far away that person is, travel expenses may be significant. For example, if one participant is located is located in Los Angeles, Calif. and another participant is located in New York, N.Y., on participant or the other would have to travel roughly 3,000 miles to meet with the other. Aside from the cost of travel itself, such long distances require a great deal of time: several hours each way. Or if one participant in the project happens to be on vacation, that participant would have to return from vacation or the meeting would have to be delayed.

Instead of meeting face-to-face, the participants can conference using their telephones. Most telephone systems today support conference calling, but such systems are generally limited to two or three calls in conference together. To address this problem, companies have developed conference systems that are essentially unlimited in terms of the number of participants. Each participant dials a telephone number to reach the host of the conference, and then dials a pass code to access the specific conference. The conference host is then responsible for connecting the caller to the target conference based on the pass code. The party that arranged the conference call is then billed for call.

FIG. 1 illustrates how such a system can operate. In FIG. 1, host machine 105 acts as a host for the telephone conference. Telephones 110, 115, 120, and 125 dial in to host machine 105 using the appropriate telephone number (of which there can be more than one, if the host offers multiple different access numbers). Based on the input pass codes, telephone 110 is connected to the same conference as telephone 115; telephones 120 and 125 are also conferenced, but are participating in a different conference call.

But there are various problems that can arise using these systems. First, some pass codes are available for limited durations. For example, when a conference call is established for a particular day and time, the host might issue a pass code that is only good for the expected duration of the conference call. This means that if the person arranging the conference call does not provide the correct pass code to the other participants in the conference, the participants might not be able to connect to the conference. This situation could occur if the person who arranges a conference call has an older message that explains most of the details about the conference, and the person arranging the conference call forgets to change the old pass code to the new pass code. This situation could also arise if the person arranging the conference call makes a simple typographical error when adding the pass code to the message to the other participants.

Even if a pass code is essentially usable forever (for example, a company might want to reserve a pass code that can be used for impromptu conferences), there can be multiple conferences (scheduled for different times) assigned to that pass code. If a participant dials into the conference at the wrong time, he might end up participating in the wrong conference. This situation could arise if the person arranging the conference accidentally indicated the wrong time, or if the conference was re-scheduled but not all the participants were aware of that fact.

A third problem can arise even if all the participants receive valid information about the conference call. Specifically, the person arranging the conference call might provide one way to access the conference. But the provided access information might not be the best way for all the participants to access the conference. For some participants, there might be better ways to access the conference, but they do not know about those better ways to access the conference.

A need remains for a way to addresses these and other problems associated with the prior art.

SUMMARY OF THE INVENTION

In an embodiment of the invention, a machine can identify a telephone conference identifier. The telephone conference identifier can be transmitted to a validation service, which can validate that the telephone conference identifier accurately identifies the intended conference.

The foregoing and other features, objects, and advantages of the invention will become more readily apparent from the following detailed description, which proceeds with reference to the accompanying drawings.

BRIEF DESCRIPTION OF THE DRAWINGS

FIG. 10 shows details of the message of FIG. 5 with secondary information about the telephone conference.

DETAILED DESCRIPTION OF THE PREFERRED EMBODIMENT

To solve the problems of the prior art, embodiments of the invention enable validation of a telephone conference identifier using a validation service. A telephone conference identifier can be as simple as the combination of a telephone number and a pass code, although it can also include additional information, as discussed below with reference to FIGS. 7 and 10. The validation service can indicate whether the telephone conference identifier will provide access to a particular telephone conference.

Figure 2:
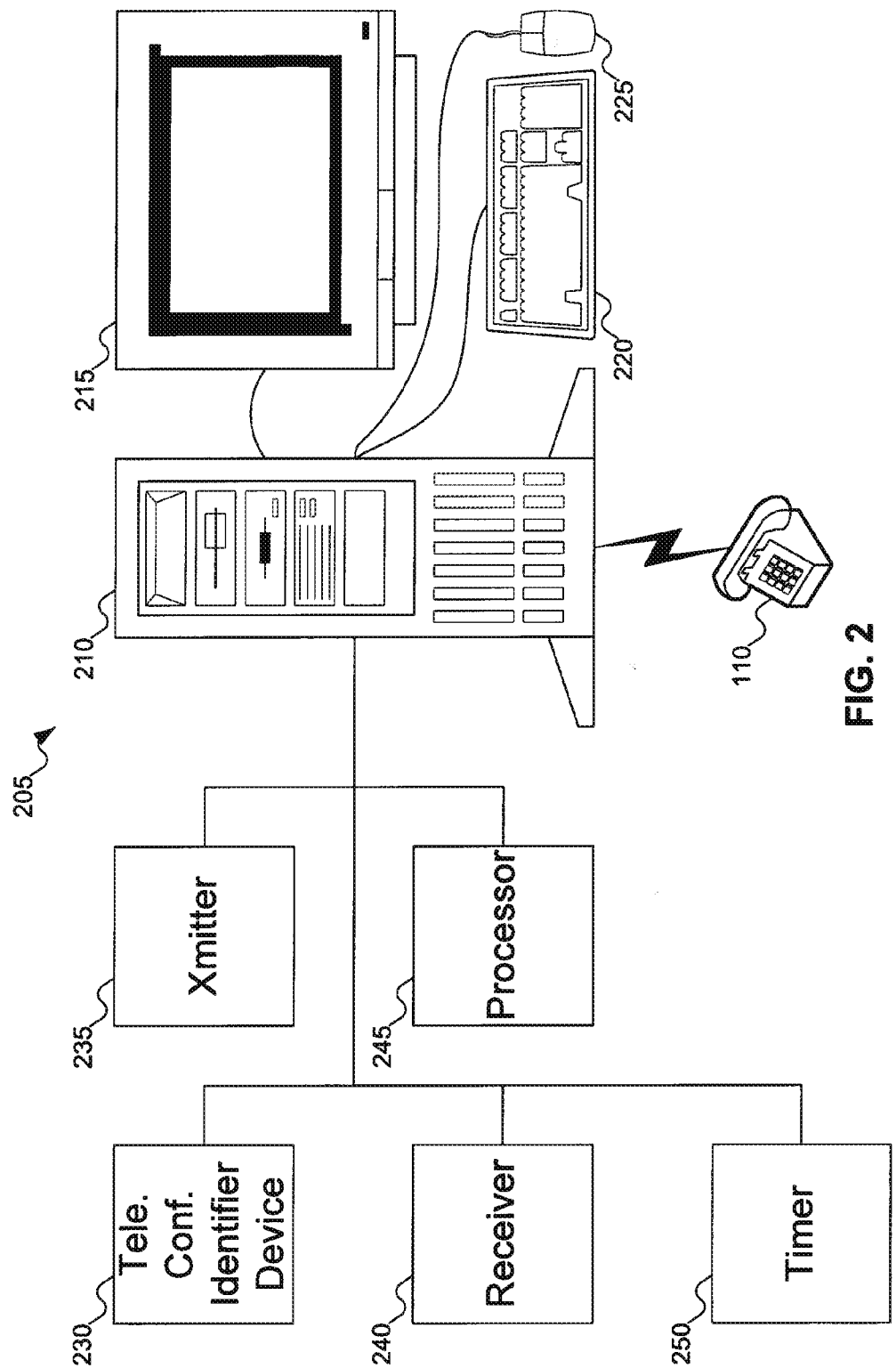
FIG. 2 shows a machine to request validation of a telephone conference identifier, according to a first embodiment of the invention.

FIG. 2 shows a machine to request validation of a telephone conference identifier, according to a first embodiment of the invention. In FIG. 2, computer system 205 is a machine used by a user. This user can be any participant in the telephone conference: for example, the person who arranged telephone conference or anyone in invited to participate in the telephone conference. Computer 205 is shown as including computer 210, monitor 215, keyboard 220, and mouse 225. A person skilled in the art will recognize that other components can be included with computer system 205: for example, other input/output devices, such as a printer. In addition, FIG. 2 does not show some of the conventional internal components of computer system 205; for example, a central processing unit, memory, storage, etc. Although not shown in FIG. 2, a person skilled in the art will recognize that computer system 205 can interact with other computer systems, either directly or over a network (not shown) of any type. Finally, although FIG. 2 shows computer system 205 as a conventional desktop computer, a person skilled in the art will recognize that computer system 205 can be any type of machine or computing device capable of providing the services attributed herein to computer system 205, including, for example, a laptop computer, a personal digital assistant (PDA), or a cellular telephone.

Computer system 205 can be connected to telephone 110. By having computer system 205 connected to telephone 110, computer system 205 can dial a telephone number automatically, without having to prompt the user to dial the telephone number. Once the telephone number is dialed, the user can pick up telephone 110 and converse with the other parties on the call, as with an ordinary telephone call. But while FIG. 2 shows telephone 110 and computer system 205 as separate components, a person of ordinary skill in the art will recognize that computer system 205 and telephone 110 can be combined. For example, computer system 205 can include a microphone and speakers (not shown in FIG. 2), which enable the user to speak to the other participants in the call and to hear them. In addition, a person of ordinary skill in the art will recognize that telephone 110 can take forms other than a standard telephone: for example, telephone 110 can be a cellular telephone or a smart phone.

To request validation of a telephone conference identifier, computer system 205 includes telephone conference identifier device 230, which can identify the telephone conference identifier. Telephone conference identifier device 230 can be implemented in software, or it can include hardware that can process a computer item to identify the telephone conference identifier. Once identified, transmitter 235 can transmit the telephone conference identifier to the validation service with a request to validate the telephone conference identifier. Receiver 240 can then receive a response from the validation service, which processor 245 can process. For example, processor 245 can cause a pop-up dialog box to appear on display 215, presenting the user with the result of the attempt to validate the telephone conference identifier. (Despite the name, processor 245 is not necessarily the central processing unit of computer 210: processor 245 can include software to process the response.) Finally, computer system 205 can include timer 250, which enables computer system 205 to periodically re-validate the telephone conference identifier (as will be discussed further below with reference to FIG. 11).

Figure 3:
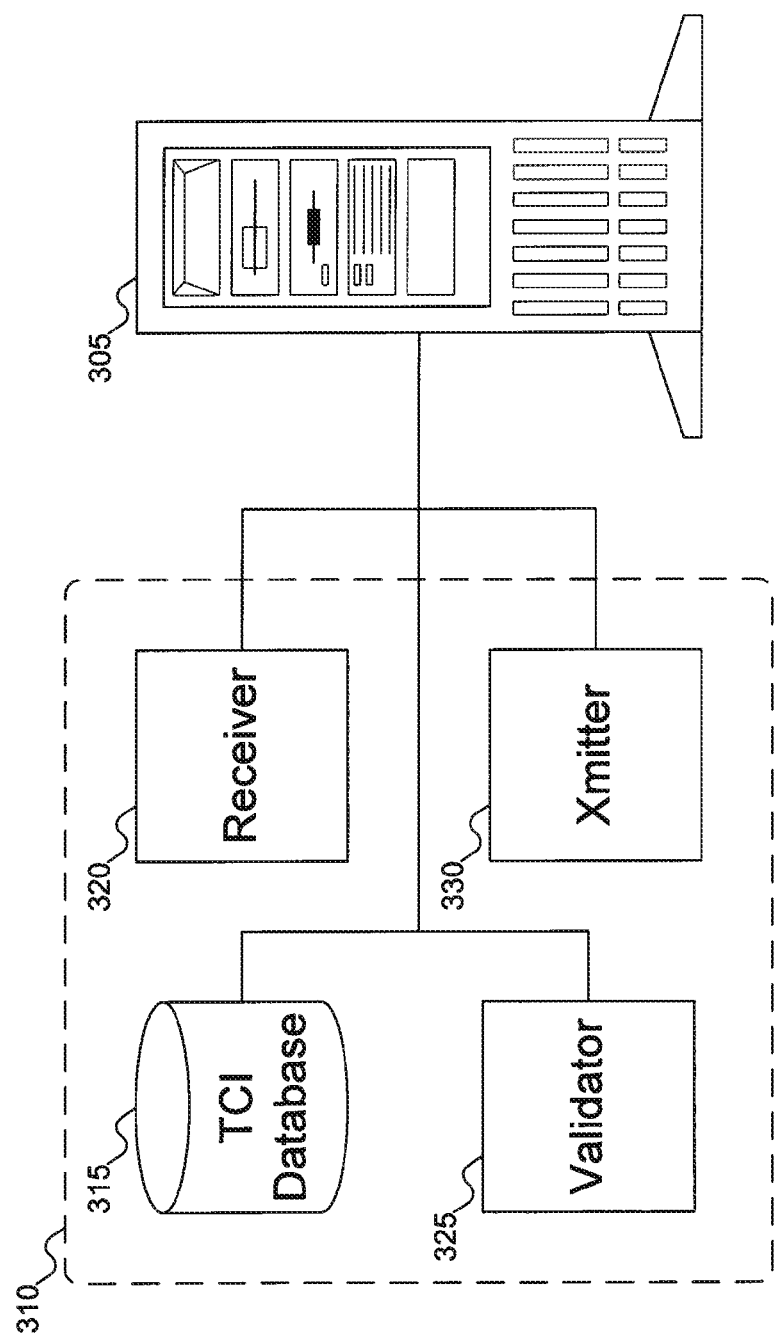
FIG. 3 shows a machine to validate a telephone conference identifier, according to a second embodiment of the invention.

FIG. 3 shows a machine to validate a telephone conference identifier, according to a second embodiment of the invention. In some respects, server 305, which is a machine operated by the party offering validation service 310, is the complementary aspect to computer system 205 of FIG. 2. Computer system 205 of FIG. 2 requests validation of the telephone conference identifier; server 305 performs that validation.

To perform the validation of a telephone conference identifier, validation service 310 includes telephone conference identifier database 315. Telephone conference identifier database 315 can store information about various telephone conferences: for example, the scheduled date and time for the conference and the pass code to be used to access the conference. (Computers typically determine the current date and time by measuring how many seconds have passed since a given date and time on the calendar—for example, 12:00:00 am on Jan. 1, 1980. In addition, the same "time" on the clock, but on a different day, is inherently a different "time". For example, 11:00 am on Jan. 1, 2009 is a different "time" than 11:00 am on Jan. 2, 2009, simply by virtue of the change in date. A person of ordinary skill in the art will therefore recognize that the concepts of "date" and "time" are directly related, and that the scheduled "time" for the telephone conference can inherently include the scheduled "date". Thus, telephone conference identifier database 315 can be said to store only the scheduled "time" for the telephone conference. Throughout this document, references to "time" will be understood to also include the corresponding date.)

Telephone conference identifier database 315 can also store additional (secondary) information about the conference, as will be discussed below with reference to FIGS. 10 and 12-14. For example, telephone conference identifier database 315 can store the e-mail addresses of the parties invited to attend the telephone conference. (This can occur, for example, if the system can identify an e-mail message of the person who arranged the telephone conference that includes a telephone conference identifier; the system can then capture the sender's e-mail address and the e-mail addresses of all the recipients of the e-mail message, and store that information in telephone conference identifier database 315.)

Validation service 310 also includes receiver 320, validator 325, and transmitter 330. Receiver 320 and transmitter 330 are responsible for receiving requests to validate telephone conference identifiers and transmitting the results of those validation efforts. Validator 325 is responsible for performing the validation of the telephone conference identifier, by comparing the received telephone conference identifier (and possibly secondary information) with information stored in the telephone conference identifier database 315.

By validating the telephone conference identifier, the party requesting validation can be confident that the telephone number included in the telephone conference identifier will connect the caller with the host of the telephone conference. The party requesting validation can also be confident that the pass code included in the telephone conference identifier will be accepted by the host of the telephone conference at the time of the telephone conference. The party requesting validation can also be confident that the telephone number included in the telephone conference identifier can be used from the user's current location (or the user's expected location at the time of the telephone conference, if the user will be at a different location at that time). Finally, to the extent the party requesting validation provided any secondary information about the telephone conference identifier, the party requesting validation can also be confident that the secondary information about the telephone conference identifier is consistent with what the validation service knows about the telephone conference (for example, that the subject of the telephone conference is consistent with what the party requesting validation expects it to be).

Figure 1:
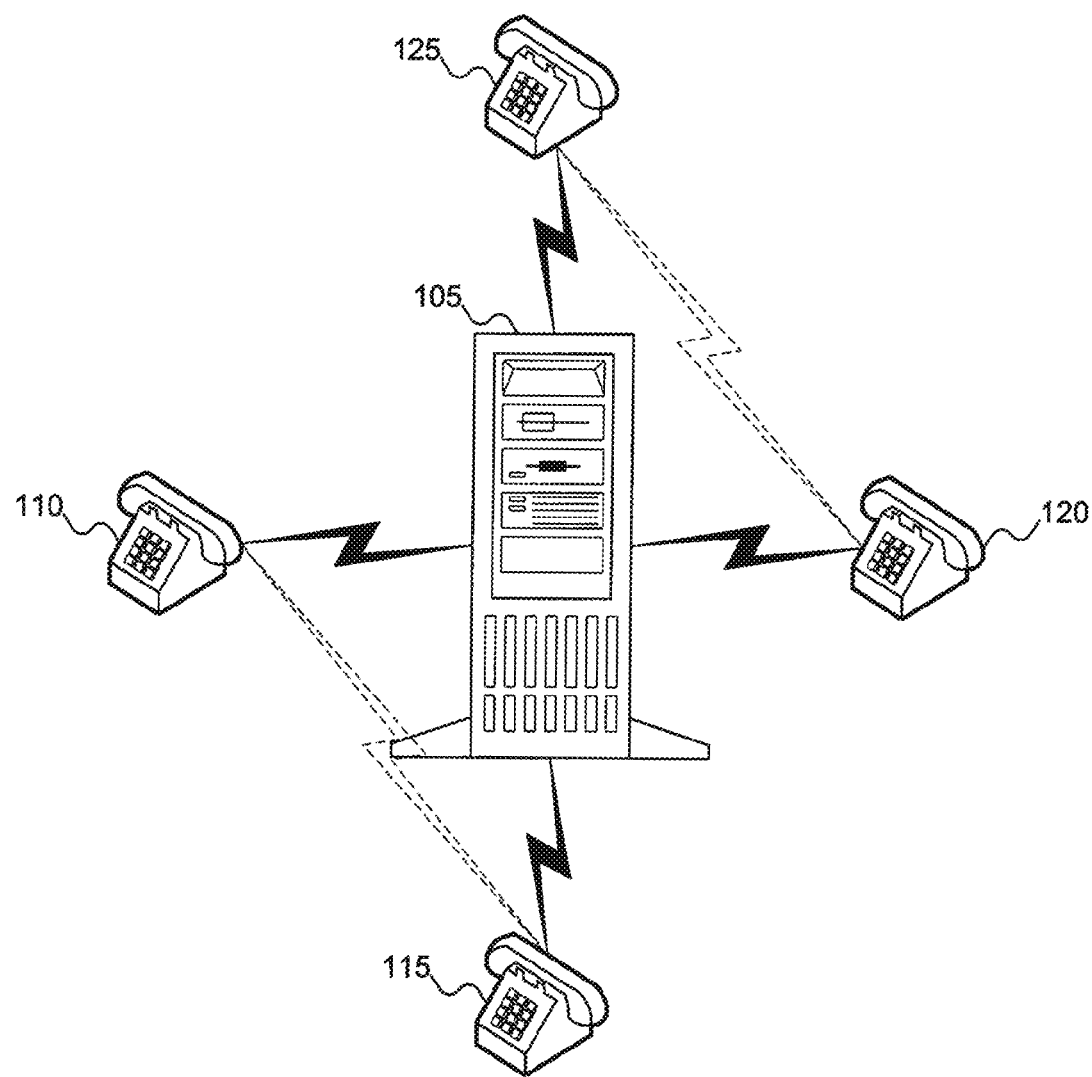
FIG. 1 shows a host machine managing conference calls for some conference participants.

In FIGS. 1 and 3, host 105 is shown as a different machine from server 305. A person of ordinary skill in the art will recognize that, in one embodiment, host 105 can be the same machine as server 305. When host 105 offers validation service 310 (i.e., when host 105 is the same machine as server 305), the validation of the telephone conference identifier is being performed by the host of the telephone conference.

In another embodiment, host 105 and server 305 can be separate machines: they can even be owned by independent companies. For example, host 105 can be one of any number of machines available to host telephone conferences, owned by any number of different companies that offer telephone conference services. Validation service 310 can be a service offered by a company independent of any and/or all of these different companies offering telephone conferencing services. (As another example, validation service 310 can be offered by a company that hosts telephone conferencing services, but which is not the company hosting the telephone conference to be validated.) But where validation service 310 is not offered by the host of the telephone conference, the structure of the system changes.

Figure 4:
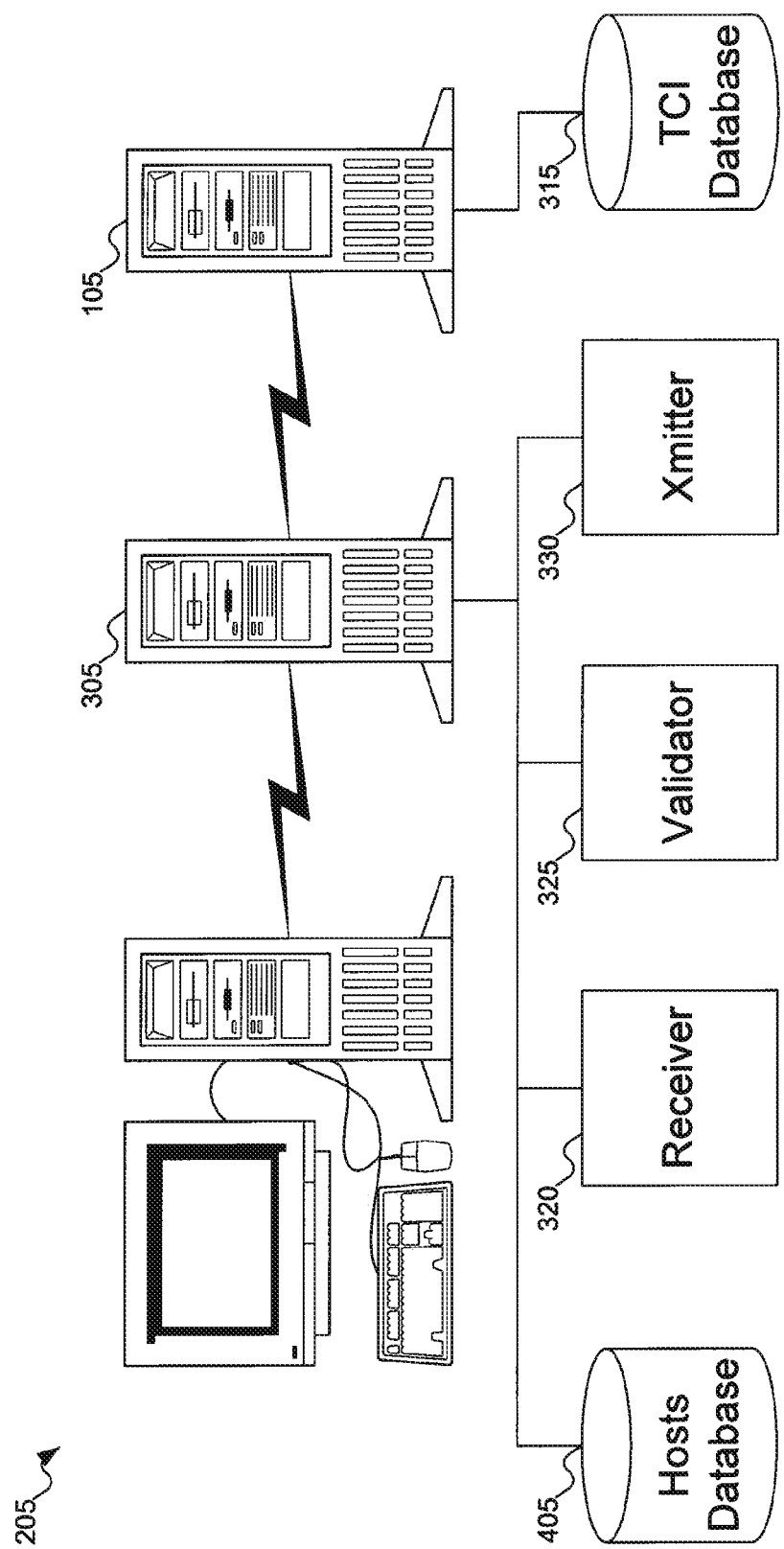
FIG. 4 shows the machines of FIGS. 1-3 arranged to perform validation of a telephone conference identifier, according to a third embodiment of the invention.

FIG. 4 shows the machines of FIGS. 1-3 arranged to perform validation of a telephone conference identifier, according to a third embodiment of the invention. In FIG. 4, computer system 205 is shown communicating with server 305, which offers the validation service. But the telephone conference itself is hosted by host 105. In this embodiment, host 105 includes telephone conference identifier database 315: as would be recognized by a person of ordinary skill in the art, host 105, as the host of the telephone conference, would have this information. The remaining components of validation service 310 of FIG. 3—receiver 320, validator 325, and transmitter 330—remain with server 305.

In addition to the remaining components of validation service 310, server 305 includes hosts database 405. Hosts database 405 enables server 305 to identify which company is hosting the telephone conference. Using this information, server 305 can communicate with host 105 to access information from telephone conference identifier database 315. Server 305 can use hosts database 405 to identify host 105 by using the telephone number for the telephone conference from the telephone conference identifier: the company to which the telephone number for the telephone conference is assigned would be the host of the conference, and therefore would own host 105 including telephone conference identifier database 315.

Although hosts database 405 can include a separate entry for each possible telephone number owned by a telephone conference host, a person of ordinary skill in the art will recognize that the telephone conference host might be assigned a contiguous block of telephone numbers. For example, a telephone conference host might be assigned all telephone numbers that begin with the prefix 555 in the area code 801. Thus, rather than storing 10,000 individual entries in hosts database 405, hosts database 405 could use a wildcard representation of the form data 801-555-XXXX, where "X" can represent any digit; any telephone number in a telephone conference identifier that matches this wildcard representation could then be mapped to the host.

As discussed above with reference to FIG. 2, any participant in the telephone conference can request validation of the telephone conference identifier. Often, to arrange a telephone conference, one person identifies all the other people who will participate in the telephone conference, and sends them an e-mail message giving them the particulars of the telephone conference (including for example the telephone conference identifier).

Figure 5:
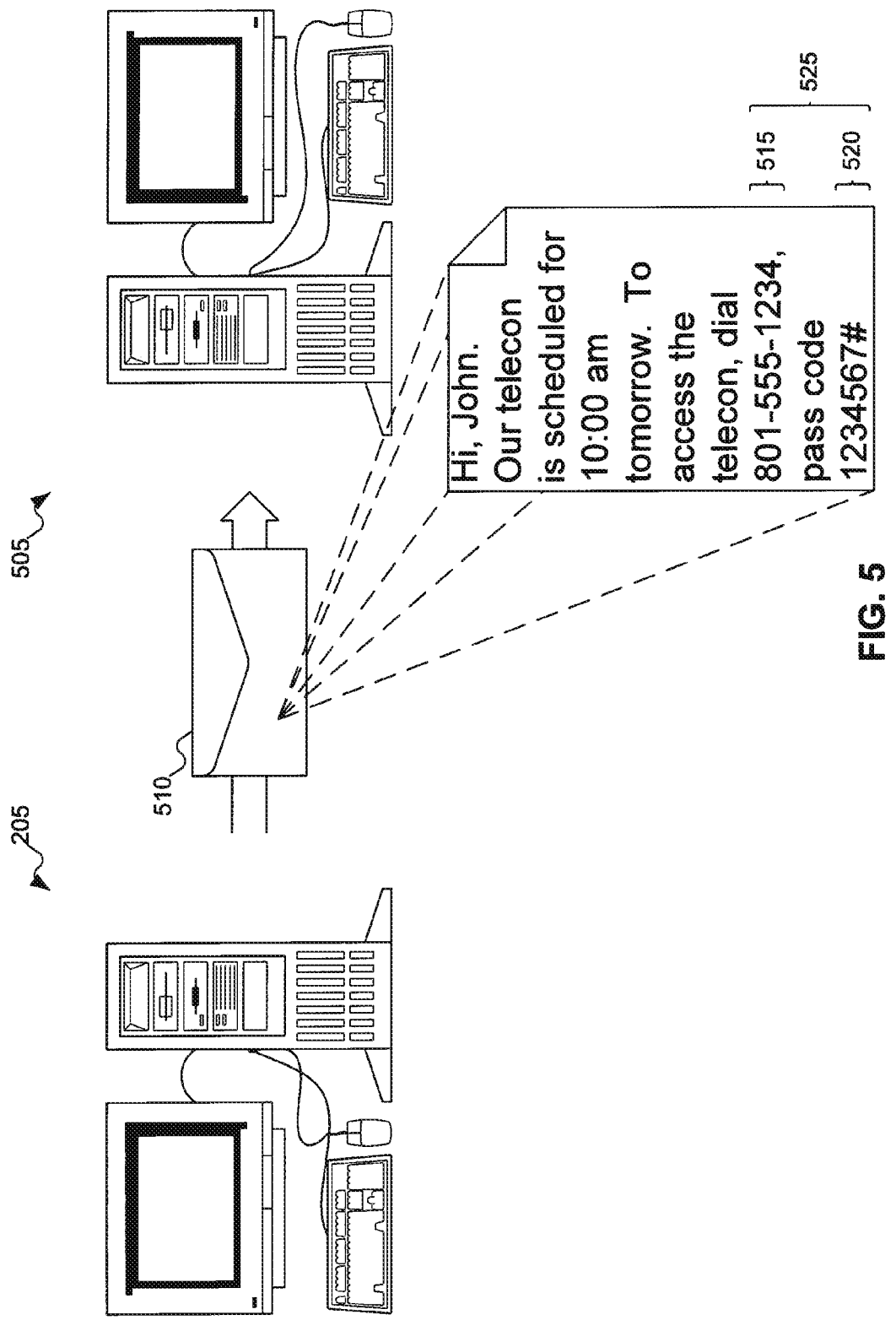
FIG. 5 shows the machine of FIG. 2 transmitting a message including a telephone conference identifier to a recipient.

In FIG. 5, computer system 205 can be the computer system of the person who arranged the telephone conference; computer system 505 can be the computer system of another participant in the telephone conference. FIG. 5 shows computer system 205 sending message 510 (for example, an e-mail message) two computer system 505. As shown in the blow up of message 510, message 510 is a message sent to a user named John, informing him that the telephone conference is set for 10:00 am the following day and specifying telephone number 515 of 801-555-1234, and pass code 520 of 1234567# as the way to access the telephone conference. Together, telephone number 515 and pass code 520 make up telephone conference identifier 525 (although, as discussed above, telephone conference identifier 525 can include additional information as well).

Although FIG. 5 shows message 510 as potentially being an e-mail message, a person skilled in the art will recognize that message 510 can be any electronic item in the computer system. For example, message 510 could be an appointment in a calendar that is being shared between the users. Throughout this document, the term "message" is intended to encompass e-mail messages, appointments, and any other electronic items in a computer system that could contain a telephone conference identifier.

Figure 6:
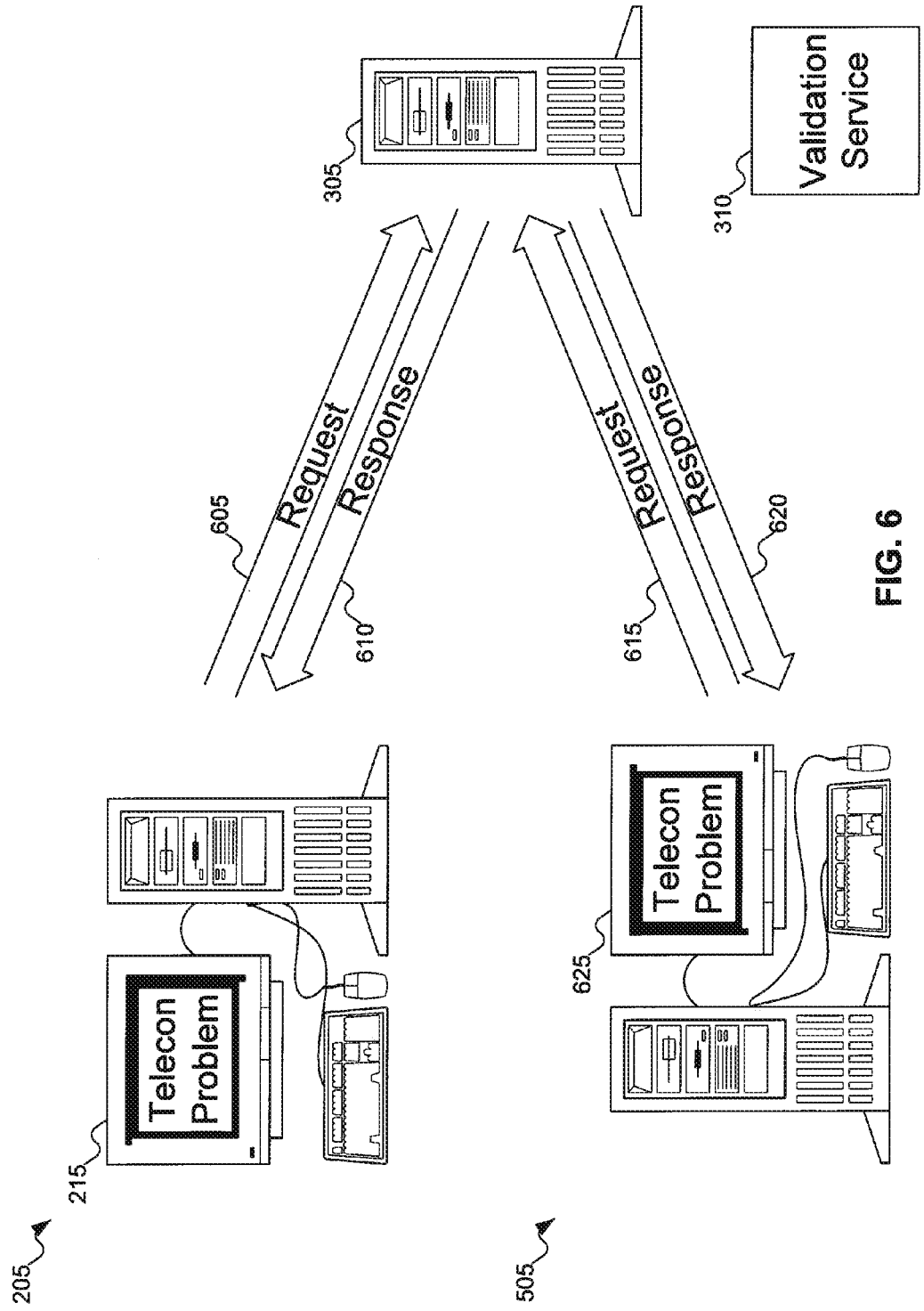
FIG. 6 shows the machines of FIGS. 2 and 5 requesting validation of telephone conference identifiers from the machine of FIG. 3.

As has been suggested above with reference to FIGS. 2-5, any participant in the telephone conference can request validation of the telephone conference identifier. For example, the person arranging the telephone conference can request validation of the telephone conference identifier before he transmits to telephone conference identifier to the other participants. Similarly, any participant, upon receipt (or anytime thereafter) of the message including the telephone conference identifier can request validation of the telephone conference identifier (for example, if the sender did not validate the telephone conference identifier before sending the message, or if the recipient does not trust that the validation is still correct). FIG. 6 shows the machines of FIGS. 2 and 5 requesting validation of telephone conference identifiers from the machine of FIG. 3.

In FIG. 6, both computer system 205 and computer system 505 are shown making requests for validation of the telephone conference identifier of validation service 310 hosted by server 305. A person skilled in the art will recognize that the sender and recipient of the message including the telephone conference identifier can independently make the request for validation of the telephone conference identifier: it is not required that both parties request validation. But as the mechanics of validation are the same regardless of who requests the validation, either party can make the validation request. In FIG. 6, computer system 205 makes request 605 of validation service 310 hosted by server 305, and receives back response 610. Similarly, computer system 505 makes request 615 of validation service 310 hosted by server 305, and receives back response 620.

FIG. 6 shows display 215 of computer system 205 and display 625 of computer system 505 reporting a problem with validating the telephone conference identifier. For example, the telephone conference identifier might not be recognized in the telephone conference identifier database. This could happen, for example, if the wrong pass code was provided as part of a telephone conference identifier. Another way this could happen would be if the telephone conference identifier includes secondary information about the telephone conference (for example the day and time of the telephone conference, or a subject of the telephone conference) that does not correspond with the information in the telephone conference identifier database.

Where validation service 310 indicates that the telephone conference identifier could not be validated, validation service 310 can inform the user as to the nature of the problem. For example, if the telephone conference identifier represents a valid telephone conference, but that occurs at a different time than that included with requests 605 and 615, validation service 310 can indicate that there is no telephone conference at the specified time, but that there will be a telephone conference at a different time for which that telephone conference identifier is valid.

But if validation service 310 includes anything more than an indication that the telephone conference identifier is not validated, this fact can create a security problem. For example, an outsider could provide a telephone conference identifier previously intercepted, in the hopes of finding out whether any upcoming telephone conferences used that telephone conference identifier. If validation service 310 were to report that there is a telephone conference scheduled for, say, 10:00 am tomorrow, the outsider would then know how to participate in that telephone conference. On the other hand, legitimate participants of the telephone conference would have no idea what is wrong with their telephone conference identifier, and would have to contact the person who arranged to the telephone conference to obtain the correct telephone conference identifier information. For example, if a participant in the telephone conference wants to validate the telephone conference identifier, but the time of the telephone conference has changed, validation service 310 would not let the participant know that the time of the telephone conference had changed: validation service 310 would simply inform the participant that his telephone conference identifier was invalid.

Thus, in the case of invalid telephone conference identifiers, validation service 310 can operate in two different ways. Validation service 310 can favor security, in which case validation service 310 responds to an improper telephone conference identifier by indicating that there is a problem, but with no additional information. Or, validation service 310 can be helpful, providing information from its databases, which might help a user to identify what is improper about the telephone conference identifier they provided.

Rather than leaving it to validation service 310 to decide how to handle security issues, there are other alternatives. In one embodiment of the invention, use of validation service 310 requires the user to be authenticated in some way. For example, the user might provide a username and password to validation service 310. Or, the user might provide a special key, use solely for authentication to validation service 310. (This special key, to prevent it from being intercepted by a third party, could be transmitted separately from the telephone conference identifier.) Or, validation service 310 can use the Internet Protocol (IP) address or the e-mail address of the person requesting validation (assuming that validation service 310 has access to such information participants in the telephone conference). Or, validation service 310 can identify the telephone number from which the participants in the telephone conference would call (again, assuming that validation service 310 has access to information about the telephone numbers from which participants in the telephone conference will call).

As discussed above, the person who arranges a telephone conference can validate a telephone conference identifier using validation service 310 before sending the telephone conference identifier to the other participants in the telephone conference. By performing validation of the telephone conference identifier before sending the telephone conference identifier to the other participants, the sender can help minimize the possibility of incorrect information being disseminated to the participants. But the other participants in the telephone conference have no way of knowing whether the sender has already performed a validation of the telephone conference identifier. (The sender of the message can, of course, state that he has performed validation of the telephone conference identifier. But such an assertion, without any supporting evidence, might be considered less than reliable.)

In one embodiment of the invention, validation service 310 can attach a validation code to response 610 (and, of course, response 620 as well). The sender can attach the validation code to his message to the other participants. By seeing the validation code, the other participants in the telephone conference and relying on the sender having already validated the telephone conference identifier, rather than performing their own independent validations. (The other participants can, of course, independently validate the telephone conference identifier anyway, if they so choose.)

Validation service 310 can generate validation codes in any desired manner. For example, validation service 310 can sequentially issue validation codes. Or, validation service 310 can randomly generate a validation code for a request to validate a telephone conference identifier. Or, validation service 310 can generate the validation code as a hash of the telephone conference identifier, either as provided by the party requesting validation of the telephone conference identifier or as stored within the databases of the host of the telephone conference. (The difference between the two approaches to generating validation code via a hash is that requests 605 and 615 might not include any secondary information about the telephone conference, even if such is available. The database of telephone conferences as stored by the host, on the other hand, will always have the secondary information, if it is available.) An advantage of generating validation code as a hash of the telephone conference identifier is that the hash is reproducible (assuming the telephone conference identifier does not change).

Validation service 310 can also digitally sign the validation code, which helps to ensure that the validation code is authentic (since a third party would not be able to digitally sign a validation code using a certificate of validation service 310).

As discussed above, any participant to a telephone conference can request validation of the telephone conference identifier from validation service 310. (Indeed, any party that has the telephone conference identifier can request validation of the telephone conference.) But a participant in the telephone conference can do more than just validate a telephone conference identifier. For example, a participant in the telephone conference can register with validation service 310.

Figure 7:
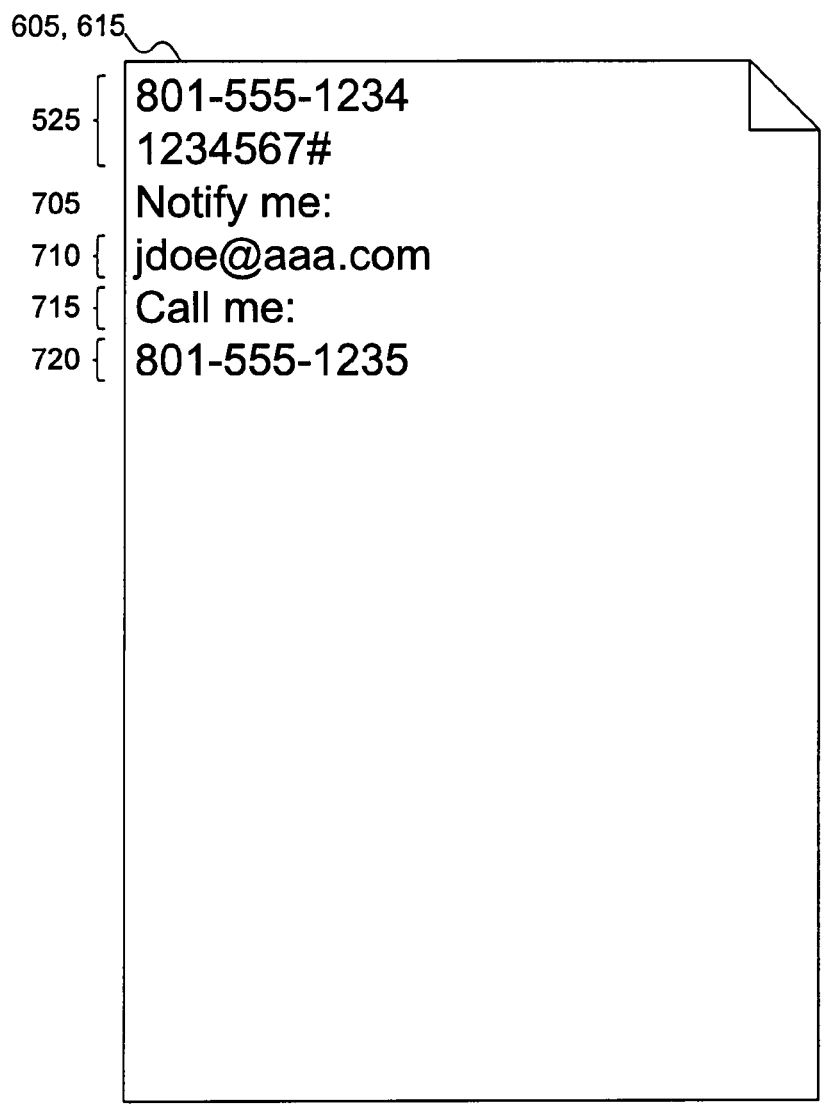
FIG. 7 shows details of the requests of FIG. 6.

In FIG. 7, either of requests 605 and 615 is shown. Requests 605 and 615 include telephone conference identifier 525. Requests 605 and 615 can also include a request to register a user for notifications of changes to the telephone conference. For example, requests 605 and 615 include notification request 705, along with e-mail address 710. If anything about the telephone conference changes—for example, the day or time scheduled for the telephone conference changes—the validation service can e-mail the user at e-mail address 710, to notify the user of the change. (A person of ordinary skill in the art will recognize that although requests 605 and 615 include e-mail address 710 as the means to notify the user about changes to the telephone conference, requests 605 and 615 to notify the user using any desired mechanism: for example, a telephone call).

As discussed above with reference to FIG. 3, the telephone conference identifier database can store information about the telephone conference beyond just the telephone number and the pass code. For example, the telephone conference identifier database can store the e-mail addresses of all the invited participants to the telephone conference (which can be collected when the system identifies a message including the telephone conference identifier). In an embodiment of the invention that collects e-mail addresses in this manner, the invited participants to the telephone conference can be automatically registered for notifications about changes to the telephone conference based on the collected e-mail addresses.

Requests 605 and 615 can also include a request to register a user for a callback service. With a callback service, instead of the participant dialing into the telephone conference, the host for the telephone conference calls the participant. This embodiment of the invention is useful in situations where companies pay for telephone conferences based on the number of lines reserved for the telephone conference, regardless of how many lines are actually used. As an example of a situation in which this might arise, a person arranging a telephone conference might expect that 30 people would be interested in participating. So the person arranging the telephone conference reserves 30 lines for this telephone conference. But if, say, only five people actually call in to the conference to participate, the company will be paying for 25 lines they do not need. On the other hand, if the telephone conference host offers a callback service, the people actually interested in participating in the telephone conference can register for the callback service. A few days before the scheduled conference, the person arranging the conference can then lock in the number of needed lines based on the number of registered participants, freeing up unneeded lines and saving their cost.

A request to register a user can be a request to register the user as a participant in the telephone conference, rather than a request for a callback. If participants in the telephone conference register their interest, this also helps manage the number of lines needed for the telephone conference. In the above example, a few days before the telephone conferences scheduled to happen, the person arranging the telephone conference can reduce the number of reserved telephone lines to five, reflecting the interest in the telephone conference. On the other hand, if 60 people register their interest in the telephone conference, the person arranging the telephone conference can then increase the number of reserved lines to 60, to account for the increased interest. This prevents interested parties from being denied access to the telephone conference simply because an insufficient number of lines were reserved.

Requests 605 and 615 include request 715, along with telephone number 720. Request 715 indicates that the user is interested in receiving the callback service. Telephone number 720 specifies the telephone number at which the user is to be called at the time of the telephone conference. A person skilled in the art will recognize that although every user can register for the callback service, such is not required. For example, some users can register for the callback service, while other users can dial into the telephone conference using the telephone conference identifier at the designated time. (A person of ordinary skill in the art will recognize that although requests 605 and 615 include telephone number 720 for the user to be called back at, the user can join the telephone conference in other ways. For example, if the host offers the ability for a user to join a telephone conference via voice over IP (VoIP), the host can contact the user over a computer, receiving the user's input via a microphone and letting the user hear the rest of the telephone conference over his speakers.)

Figure 8:
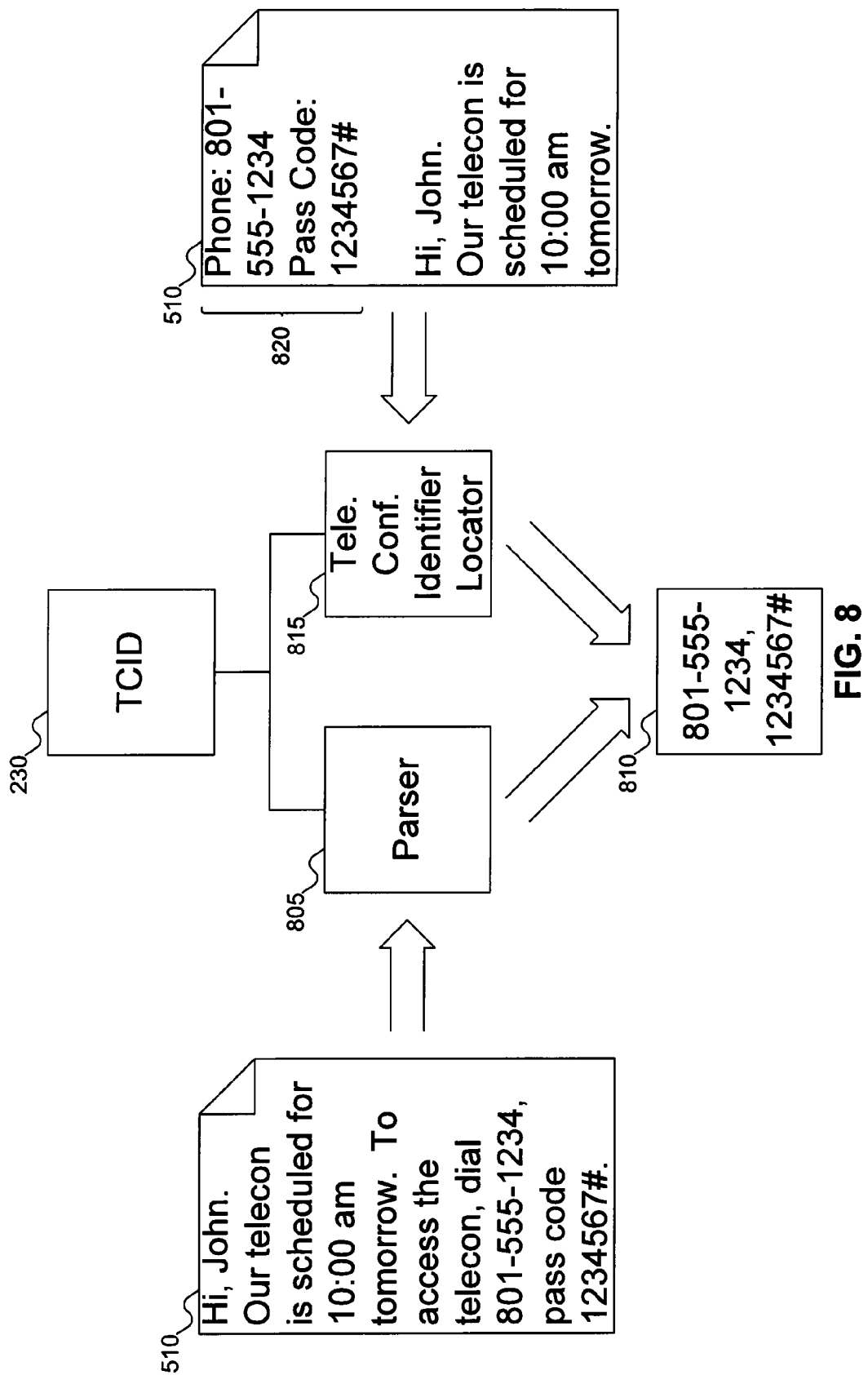
FIG. 8 shows the telephone conference identifier device of FIG. 2 identifying a telephone conference identifier in a message.

In the discussion above, it has been assumed that the user's machine (for example, computer system 205 of FIG. 2, or computer system 505 of FIG. 5) can somehow identify a telephone conference identifier in a computer item such as a message. FIG. 8 demonstrates ways in which telephone conference identifier device 230 can perform such an identification.

In one embodiment of the invention, telephone conference identifier device 230 includes parser 805. Parser 805 is capable of scanning a message and syntactically recognizing a telephone conference identifier located in the message. For example, message 510 includes the telephone number 801-555-1234 and the pass code 1234567#. Parser 805 can use syntactic rules (not shown in FIG. 8) to identify the telephone number and the pass code. The result of this parsed message 510 is telephone conference identifier 810.

In addition, parser 805 can process message 510 as it is being typed. This is similar to how spellcheckers and grammar checkers are capable of reviewing a document as it is being generated, rather than waiting for the document to be completed and for the user to specifically request checking of the document. If parser 805 syntactically recognizes a telephone conference identifier in the message as the messages being generated, parser 805 can immediately identify the telephone conference identifier as such.

In another embodiment of the invention, the message can include fields specifically for the purpose of storing telephone conference identifiers. For example, e-mail messages can include fields to store the primary intended recipient (the TO: field), secondary recipients (the CC: and BCC: fields), and a subject of the e-mail message (the SUBJECT: field). Similarly, appointments in a calendar can include fields to store a subject for the appointment (the SUBJECT: field) and the location where the appointment is to take place (the LOCATION: field). E-mail messages, appointments, and other electronic items in the computer can be modified to include field (s) to store telephone conference identifiers.

In this other embodiment of the invention, telephone conference identifier 230 can include telephone conference identifier locator 815. Telephone conference identifier locator 815 can locate the telephone conference identifier field(s) within message 510, and use this field(s) to construct telephone conference identifier 810.

Figure 9:
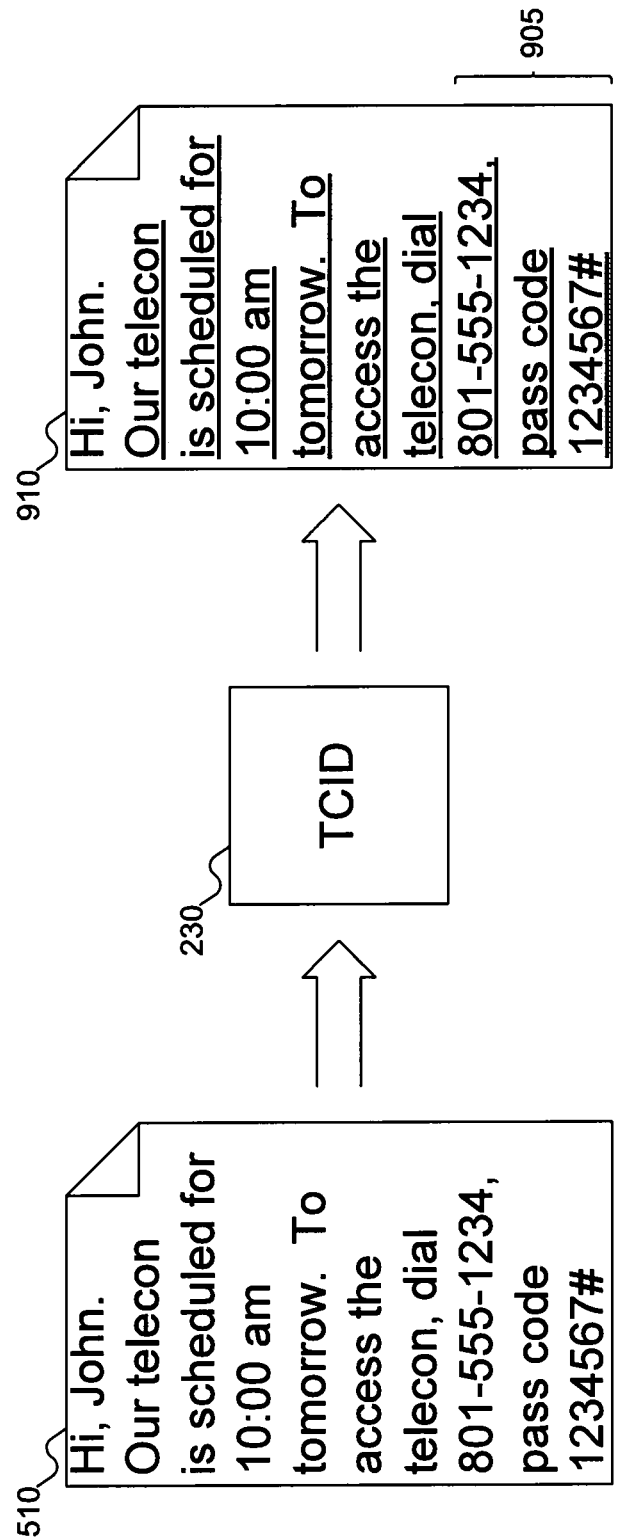
FIG. 9 shows the telephone conference identifier device of FIG. 2 marking a telephone conference identifier in a message.

However telephone conference identifier device 230 identifies telephone conference identifier 810, telephone conference identifier 230 can mark telephone conference identifier 810 in message 510. By marking telephone conference identifier 810 in message 510, telephone conference identifier device 230 makes it easier for the user to spot telephone conference identifier 810 in message 510. FIG. 9 shows an example of how telephone conference identifier 230 can mark a telephone conference identifier in a message. In FIG. 9, telephone conference identifier 230 has marked the telephone conference identifier in message 510 by turning the telephone conference identifier into hyperlink 905, as shown in message 910. That the telephone conference identifier in message 910 is now hyperlinked 905 is shown by the fact that the telephone conference identifier is underlined. If a user were to click on hyperlink 905, the hyperlink could trigger the transmission of a request to the validation service to validate the telephone conference identifier; the user would then see the response from the validation service on screen.

In one embodiment of the invention, selecting hyperlink 905 results in sending the request to validate the telephone conference identifier using default settings (for example, using whatever telephone conference identifier information has been identified in the message, and assuming the user's default location is where the user will be at the time of the telephone conference). In this embodiment of the invention, the user only needs to perform one click, and will receive the results of the validation attempt as a result. But the user may know that the default settings might not suffice (for example, the user might not be at his computer at the time of the telephone conference). To override these default settings, the user can right-click on hyperlink 905 to select an option that will change the default settings. For example, the user can select an option that specifies an alternative location for the user at the time of the telephone conference (perhaps manually inputting an alternative location or selecting an alternative location from a list of known alternative locations). Or, the user can opt to provide secondary information regarding the telephone conference identifier (not included in message 510).

Although FIG. 9 shows a telephone conference identify or device 230 as marking the telephone conference identifier in message 510 by converting the telephone conference identifier to hyperlink 905, a person skilled in the art will recognize that there are other ways in which the telephone conference identifier can be marked. The purpose of "marking" the telephone conference identifier is to make the telephone conference identifier easier to locate in a message by a user. To that end, "marking" can be accomplished by converting the telephone conference identifier into hyperlink, or by visually emphasizing the telephone conference identifier in some way (for example, by highlighting the telephone conference identifier or by changing its font or color). "Marking" can also be accomplished in other ways: for example by having the computer system generates some unique sound, either when a message includes a telephone conference identifier, when the telephone conference identifier comes on screen for the first time, or when the user hovers a cursor over the telephone conference identifier using a mouse. But by converting the telephone conference identifier into hyperlink 905, the "marking" of the telephone conference identifier can add the functionality of validating the telephone conference identifier at the user's request.

As discussed above with reference to FIGS. 3 and 6, a telephone conference identifier can include secondary information. FIG. 10 shows some secondary information that can be included with a telephone conference identifier. In FIG. 10, message 510 is shown as including telephone conference identifier 1005 and secondary information 1010. Secondary information 1010 is shown as including the person arranging the telephone conference (the FROM: field), the other participants in the telephone conference (the TWO: and CC: fields), the subject of the telephone conference (the SUBJECT: field), and the date and time of the telephone conference (the DATE: and TIME: fields). A person of ordinary skill in the art will recognize that the fields shown in secondary information 1010 are exemplary: there can be other fields included as secondary information, and secondary information 1010 does not need to include all of the fields shown in FIG. 10.

Figure 11:
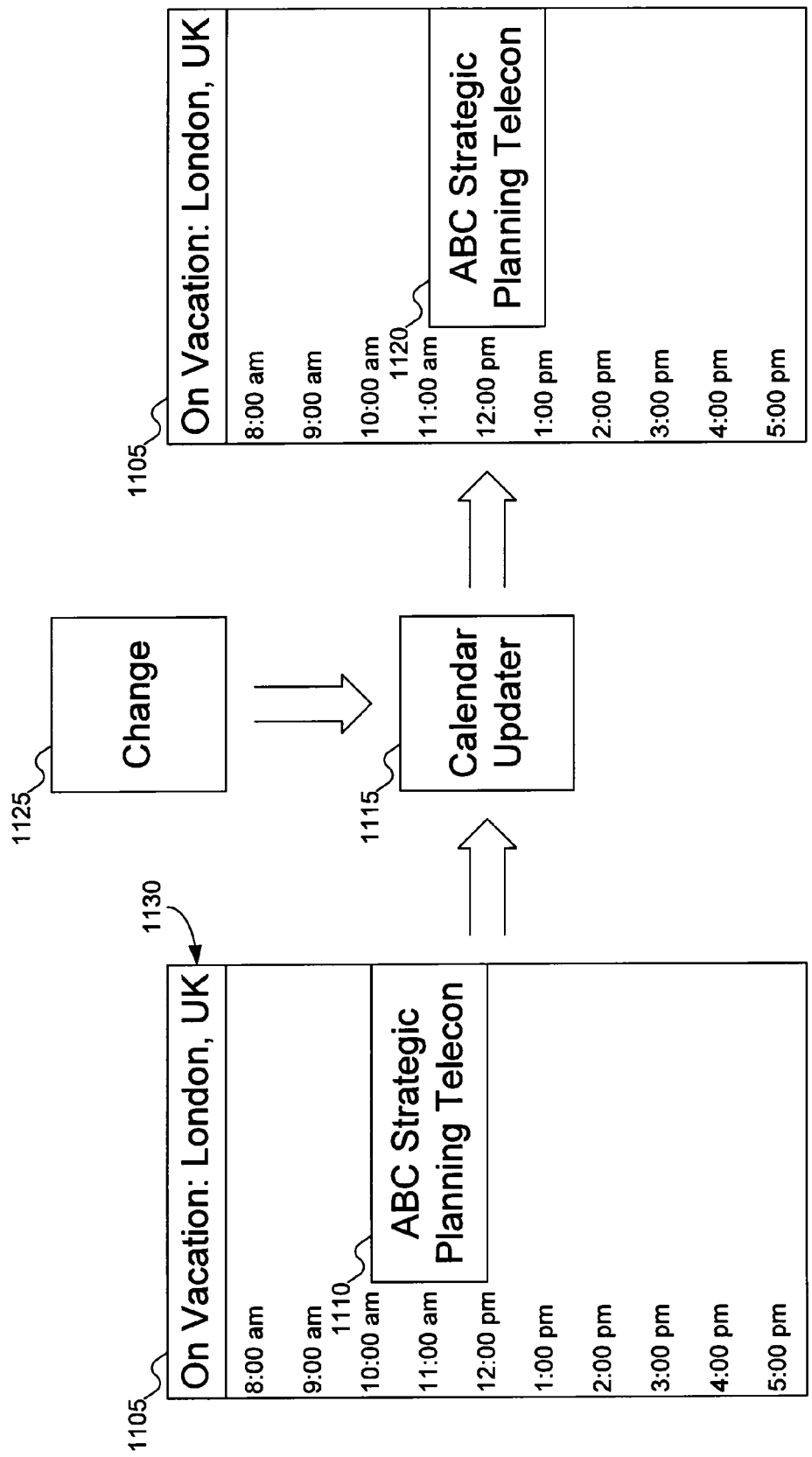
FIG. 11 shows a calendar updater updating a scheduled conference in a calendar, according to a fourth embodiment of the invention.

In much of the above discussion, it has been the user who has been responsible for requesting validation of a telephone conference identifier. But as discussed above with reference to FIG. 2, a user's computer can include timer 250, which can be used to periodically revalidate a telephone conference identifier. An example of a situation in which this would be useful is shown in FIG. 11. In FIG. 11, a user's computer includes calendar 1105, which includes scheduled appointment 1110 for a telephone conference at 10:00 am. Assuming that the user's computer uses timer 250 shown in FIG. 2 to periodically automatically revalidate a telephone conference represented as appointment 1110, if the user's computer finds out that the telephone conference has been rescheduled from 10:00 am to 11:00 am, calendar updater 1115 can update scheduled appointment 1110 to scheduled appointment 1120, to reflect the new start time for the telephone conference.

Another way in which scheduled appointment 1110 can automatically be updated to reflect the new time for the telephone conference is if the user has registered for notification of changes, as discussed above with reference to FIGS. 6 and 8. If the user has registered to be notified of changes, the user's computer can receive change 1125, reflecting that the scheduled time for the telephone conference has changed. Calendar updater 1115 can process change 1125 and update scheduled appointment 1110 as scheduled appointment 1120, to reflect the new scheduled start time for the telephone conference.

FIG. 11 also reflects that the user is scheduled to be on vacation in London, England on the scheduled day of the telephone conference, as shown by a vacation indicator 1130. Given that the user plans on being in an atypical location at the scheduled time of the telephone conference, the telephone number provided as part of a telephone conference identifier by the person who arranged to the telephone conference might not be the best way for this user to access the telephone conference. For example a telephone number in the 801 area code would be an international long distance call for someone in London, England. As international long distance calls can be expensive, alternative ways for the user to join the telephone conference might potentially be less expensive. In addition, calling international long distance can be a complicated process: there may also be easier ways for the user to join the telephone conference than by dialing an international long distance call from overseas.

Although FIG. 11 shows the validation service determining the user's location from calendar 105, a person of ordinary skill in the art will recognize that location information can be provided in other ways. For example, the user can manually input his expected location at the time the telephone conference. Or, the system can identify the user's location based on the Internet Protocol (IP) address of the computer from which the validation request is issuing. Or, the system can interface with a global positioning system (GPS) device in the user's possession, to determine the user's current location.

Figure 12:
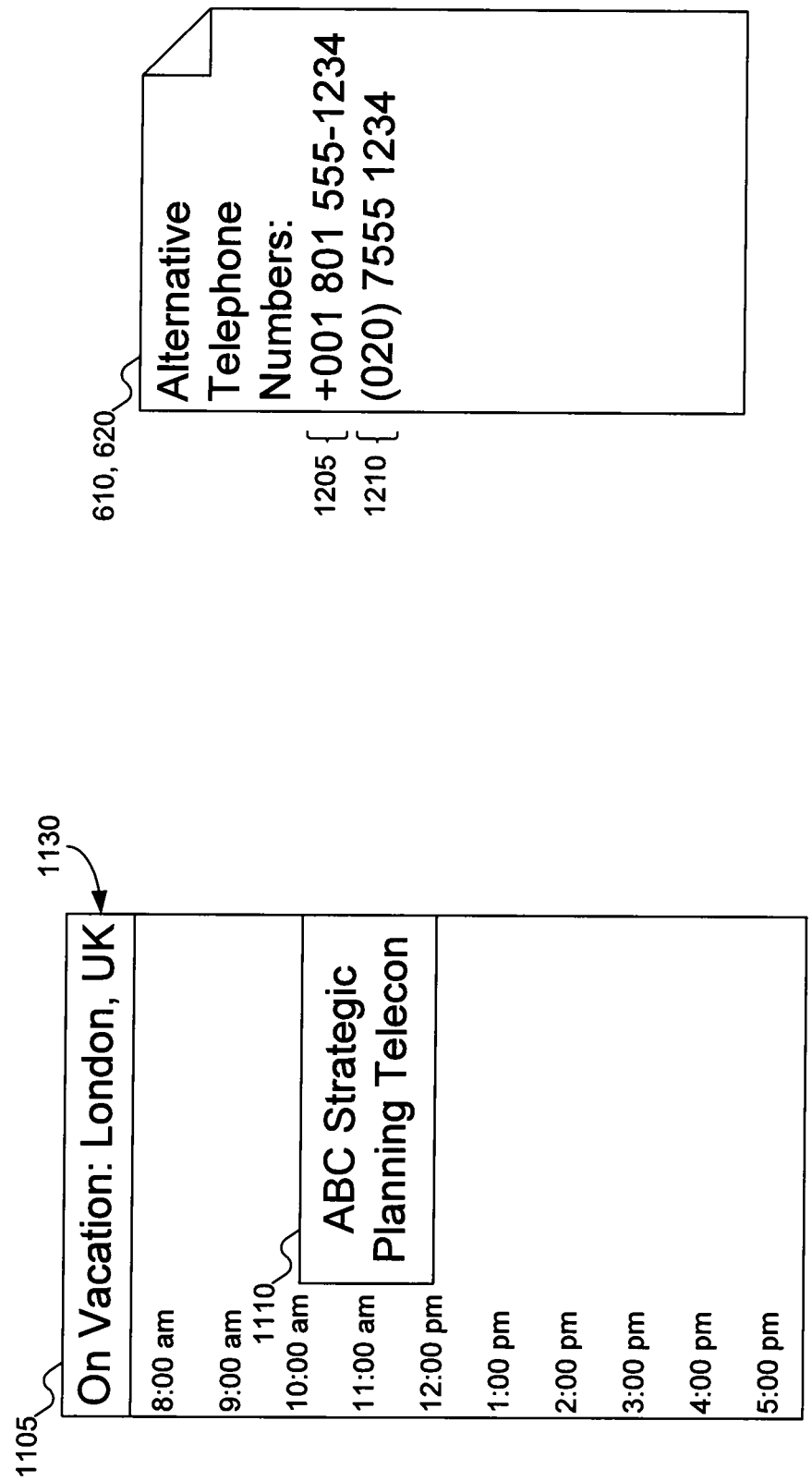
FIG. 12 shows a response from the machine of FIG. 3 suggesting alternative telephone numbers for a conference.

FIG. 12 shows an embodiment of the invention in which the system can provide the user with alternative means to access the telephone conference. In the FIG. 12, calendar 1105 is shown, which includes vacation indicator 1130, showing that the user plans on being in London, England on the day of the telephone conference. By including the user's location as secondary information for the telephone conference identifier, the validation service can provide alternative means for the user to access the telephone conference. This is demonstrated by responses 610 and 620 and FIG. 12. Responses 610 and 620 include alternative telephone numbers that the user can utilize to access the telephone conference. Note that alternative telephone number 1205 is the same telephone number as that provided in message 510 (on FIG. 5), but formatted for use from overseas. In addition, responses 610 and 620 include alternative telephone number 1210. Alternative telephone number 1210 can be a local access number offered by the host of the telephone conference. Thus, instead of the user having to dial international long-distance overseas (and incur the international long distance charges), the user can use local access number 1210, which is simpler to dial and would incur less expense.

Embodiments of the invention can automatically substitute an alternative telephone number for the one provided by the person arranging the telephone conference, based on the users expected location at the time of the telephone conference. Alternatively, embodiments of the invention can inform the user of all the available telephone numbers that can be used, and leave it to the user to decide which telephone number to use to access the telephone conference.

Figure 13:
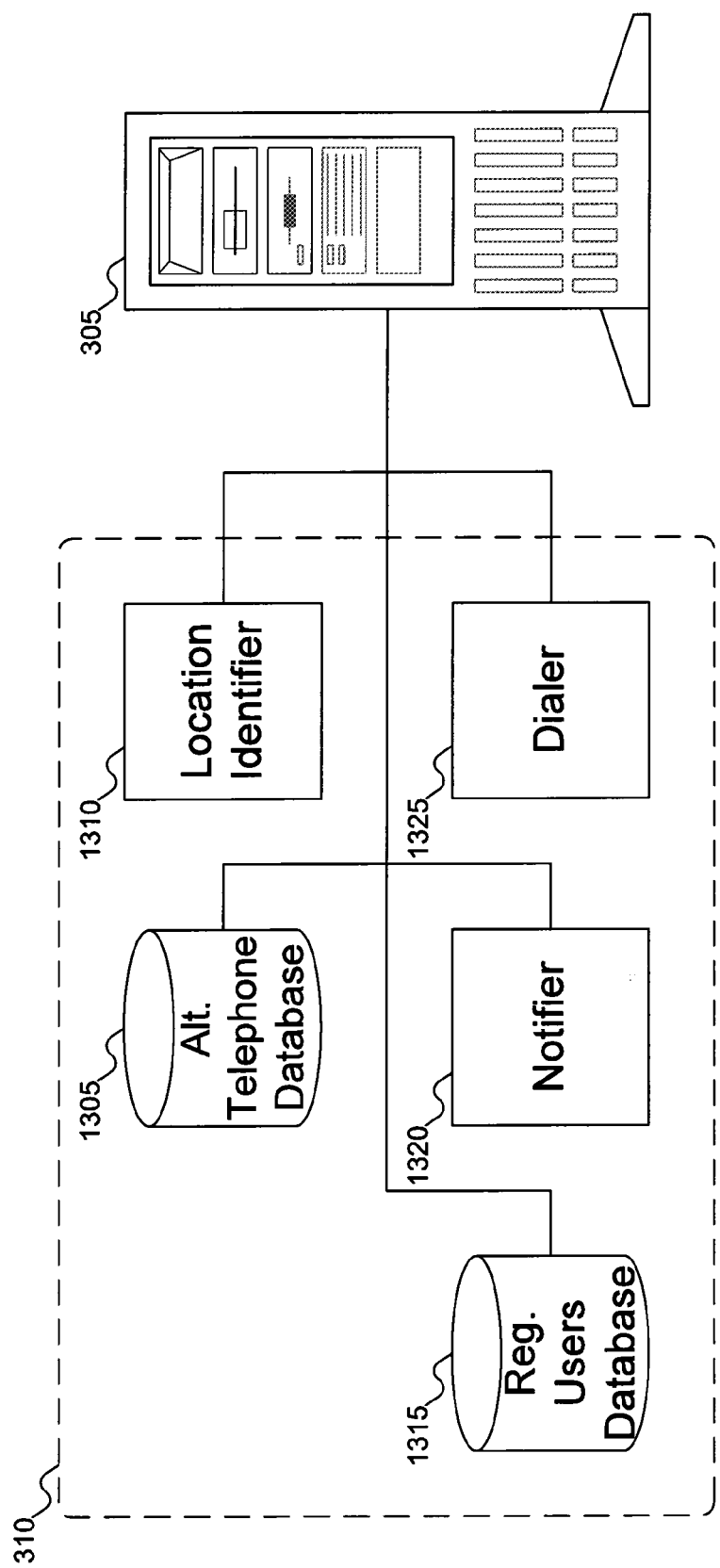
FIG. 13 shows the machine of FIG. 3, operative to register users for notifications and calls.

As discussed above with reference to FIG. 3, validation service 310 includes the minimum necessary to perform telephone conference identifier validation. To support capabilities of other embodiments of the invention, as discussed above with reference to FIGS. 6-7 and 11-12, validation service 310 can include additional complements, as shown in FIG. 13. In the FIG. 13, validation service 310 is shown as also including alternative telephone database 1305 and location identifier 1310. Location identifier 1310 can identify the user's location (for example, from information gleaned from the user's calendar or by using the Internet Protocol (IP) address of the user's computer). Based on the user's location, validation service 310 can access alternative telephone database 1305 and identify alternative telephone numbers that may be easier for the user to use or that may be less expensive, among other possibilities.

Validation service 310 can also include registered users database 1315. Registered users database 1315 can store information about users that are registered for telephone conferences. If a scheduled time for a telephone conference changes, validation service 310 can access registered users database 1315, identify the users who are registered for that telephone conference, and notify them using notifier 1320 about the change in the scheduled time of a telephone conference. Similarly, when the scheduled time for a telephone conference arises, validation service 310 uses registered users database 1315 to identify the users who have registered for a callback at the time of the telephone conference, and use dialer 1325 to call the users who are registered.

As discussed above with reference to FIGS. 3 and 6, the validation service might have collected the e-mail addresses of the invited participants to the telephone conference from the e-mail message announcing the telephone conference to the participants. Thus, a person of ordinary skill in the art will recognize that registered users database 1315 can be combined with the telephone conference identifier database of FIG. 3 (or alternatively, that the some of information described as being stored in telephone conference identifier database 315 of FIG. 3 can also be stored in registered users database 1315 of FIG. 13).

Figure 14:
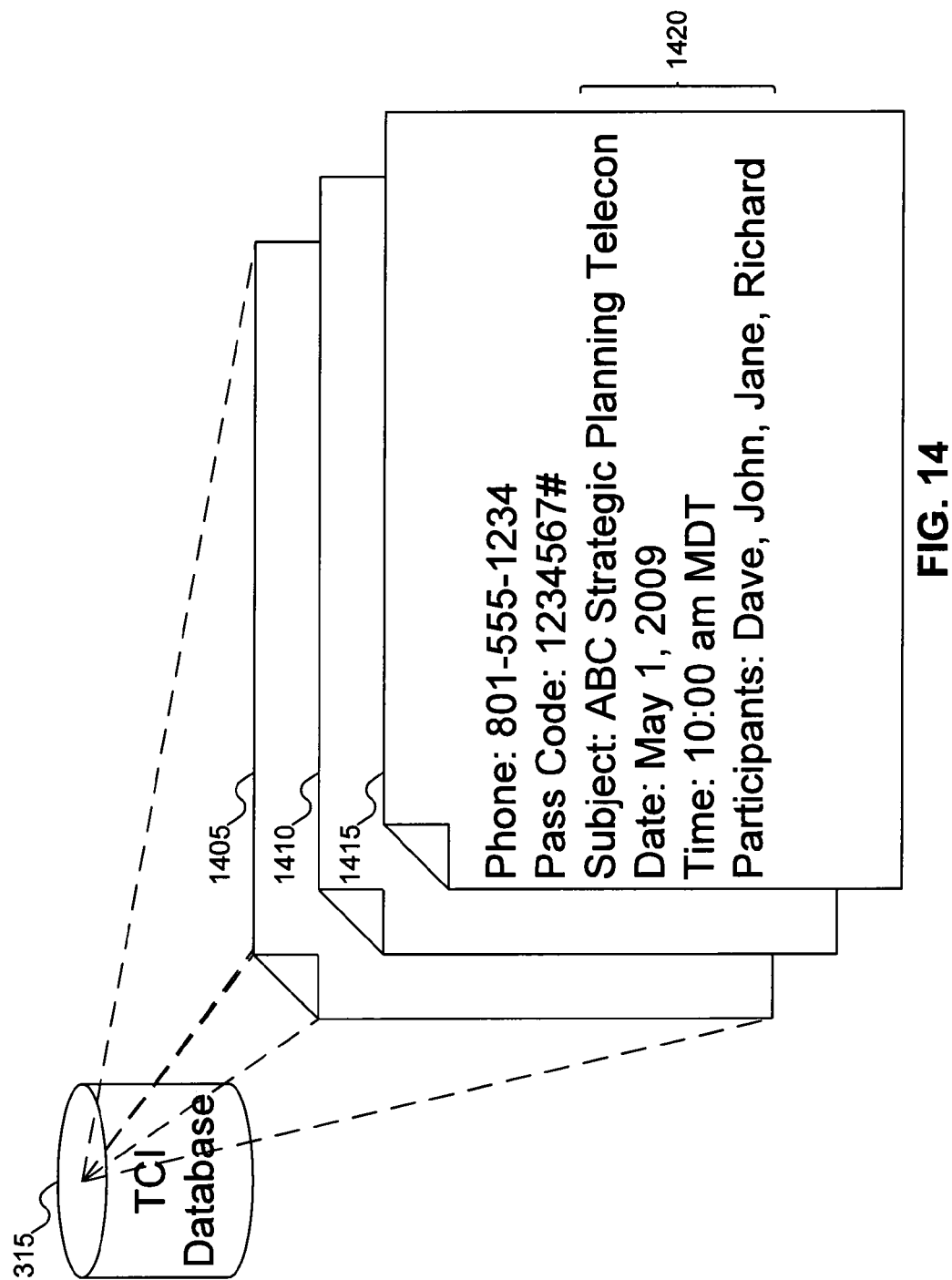
FIG. 14 shows details of the database of telephone conference identifiers of FIG. 3.

Now that the concept of the telephone conference identifier, including secondary information, has been discussed, the information stored in telephone conference identifier database 315 can now be described. FIG. 14 shows details of the database of telephone conference identifiers of FIG. 3. In the FIG. 14, three records 1405, 1410, and 1415 are shown. A person of ordinary skill in the art will recognize that there can be any number of records in telephone conference identifier database 315, and that the three records shown in FIG. 14 are merely exemplary.

Telephone conference identifier record 1415 stores information about the telephone conference. For example, telephone conference identifier record 1415 includes a telephone number and the pass code to be used to access the telephone conference. Telephone conference identifier record 1415 can also store secondary information 1420. As discussed above with reference to FIG. 6, the validation service can use secondary information 1420 to confirm that the telephone conference identifier being validated is correct. For example, even if a user provides a telephone number and pass code as a telephone conference identifier that is in telephone conference identifier database 315, it might be that the user also provided a subject for the telephone conference. If the subject for the telephone conference in the telephone conference identifier does not correspond to the subject of the telephone conference in the record in telephone conference identifier database 315, then the telephone conference identifier is not valid.

In all of the above discussion, it has been assumed that the validation service is a web service. In one embodiment of the invention, validation service is, in fact, a web service. But in another embodiment of the invention, the validation service can be accessed via a telephone. In this embodiment of the invention, validation service is dialed up, and the telephone conference identifier is provided to the validation service over the telephone. The validation service can then process the telephone conference identifier as described above, and the result of the validation attempt can be returned to the user over the telephone.

Figure 15A:
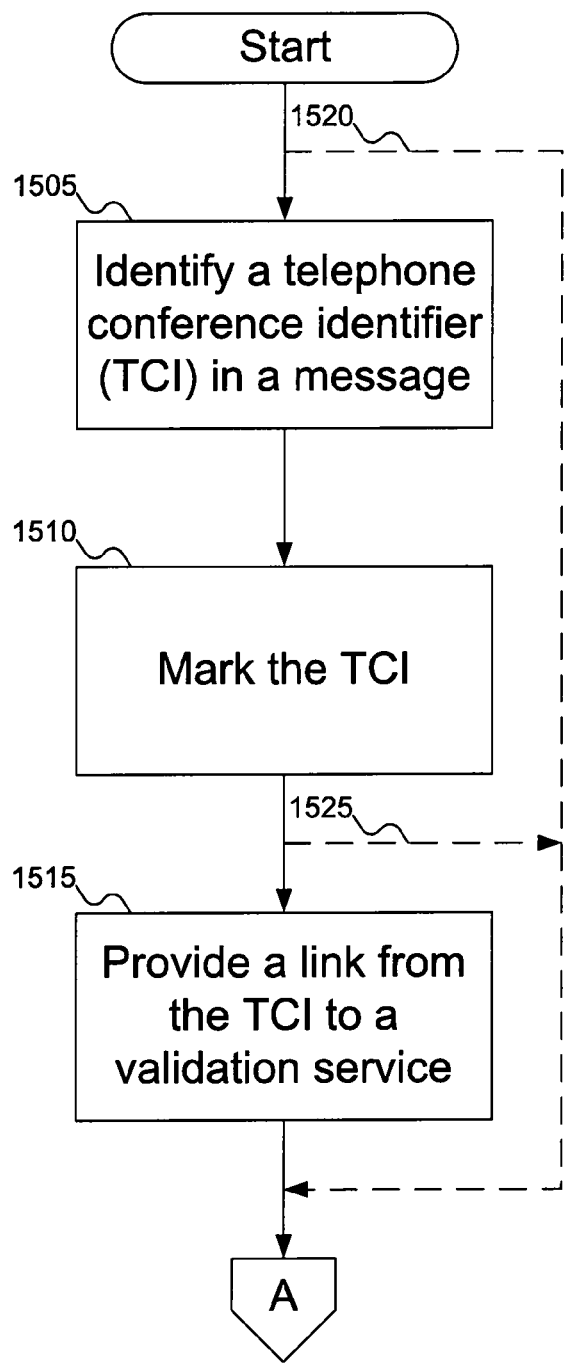
FIGS. 15A-15B show a flowchart of the procedure to request validation of a telephone conference identifier using the machine of FIG. 2.
Figure 15B:
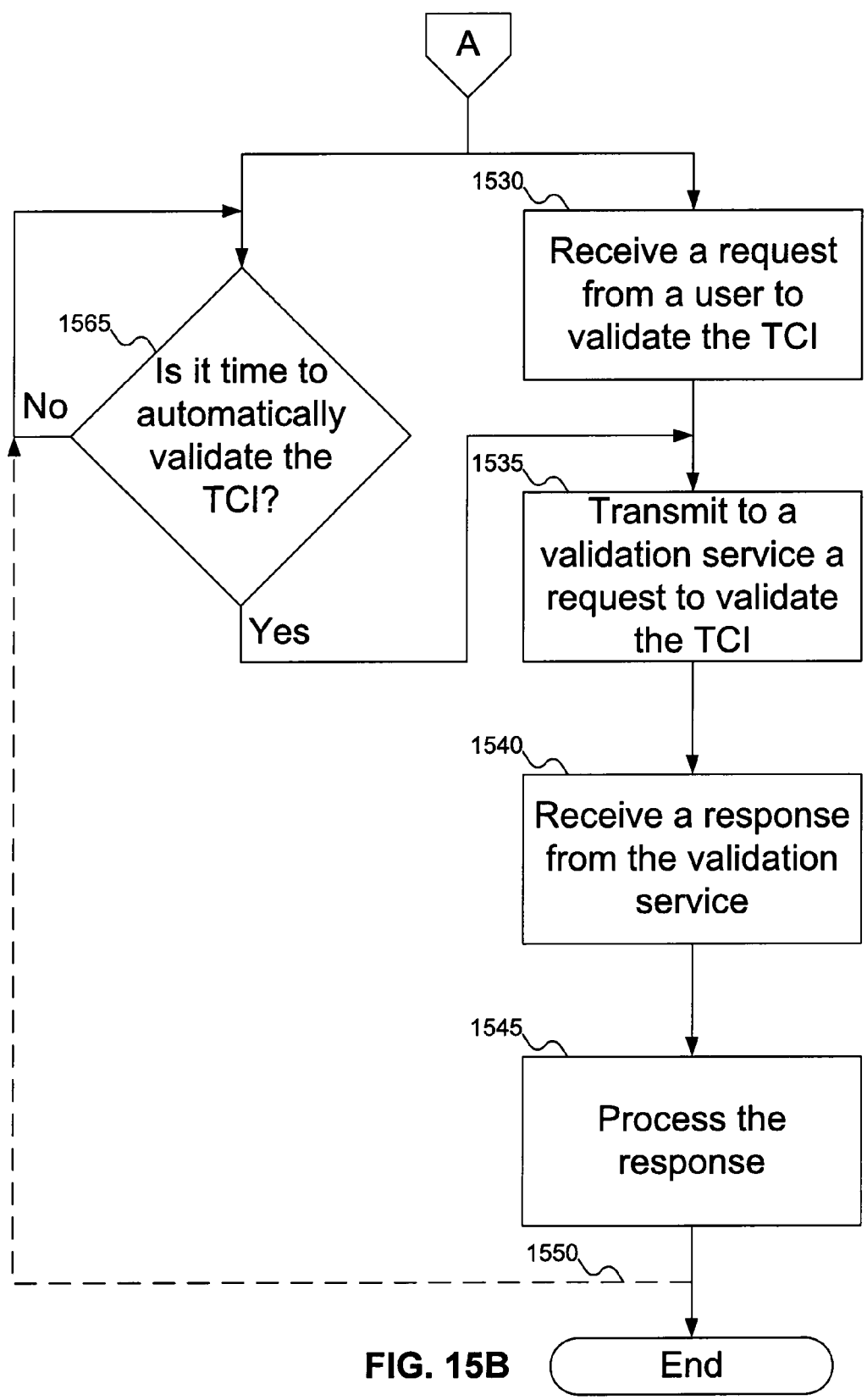

FIGS. 15A-15B show a flowchart of the procedure to request validation of a telephone conference identifier using the machine of FIG. 2. In FIG. 15A, at block 1505, the system identifies a telephone conference identifier in a message. At block 1510, the system marks the telephone conference identifier. At block 1515, the system provides a link from the telephone conference identifier to the validation service. As discussed above with reference to FIG. 9, providing a link from the telephone conference identifier to a validation service can be part of marketing the telephone conference identifier.

As shown by dashed line 1520, blocks 1505, 1510, and 1515 can be omitted. In addition, as shown by dashed line 1525, blocks 1505 and 1510 can be performed, but block 1515 can be omitted.

In FIG. 15B, the flowchart bifurcates. At block 1530, the system can receive a request from a user to validate the telephone conference identifier. At block 1535, the system transmits a request to validate the telephone conference identifier to a validation service. At block 1540, the system receives a response from the validation service. And at block 1545, the system processes the response.

Alternatively, as discussed above with reference to FIGS. 2 and 11-12, the system can automatically (and periodically) validate the telephone conference identifier. In block 1565, the system waits until it is time to automatically validate the telephone conference identifier. Once the time has arrived to validate a telephone conference identifier, processing continues at block 1535, as discussed above. Processing can return to block 1565 for later automatic revalidation along dashed line 1550.

Figure 16:
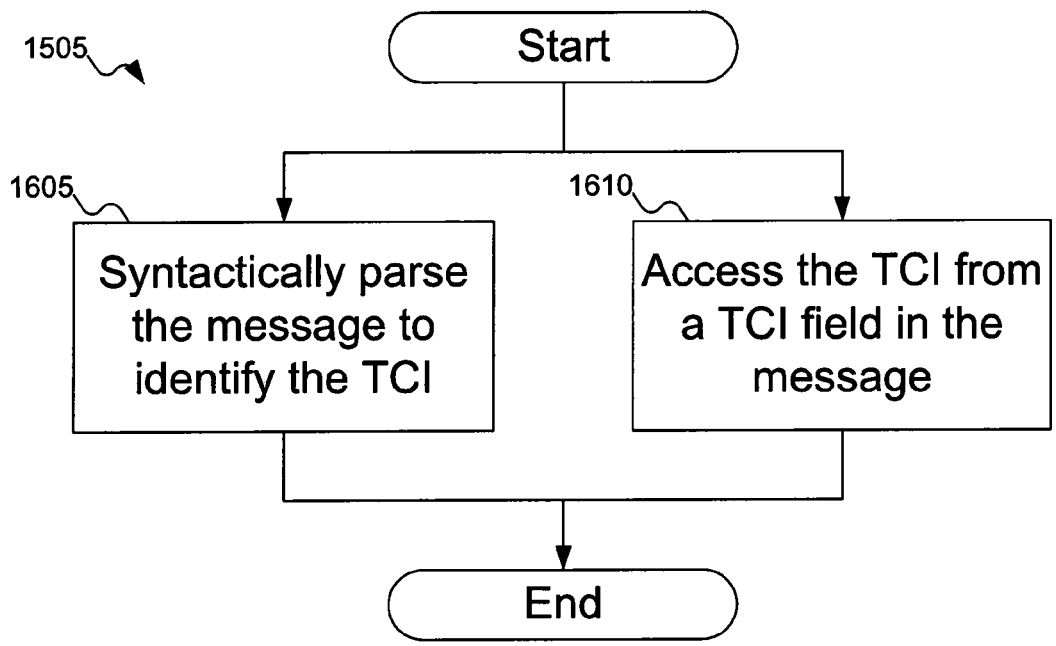
FIG. 16 shows a flowchart of the procedure for identifying a telephone conference identifier in the flowchart of FIGS. 15A-15B.

FIG. 16 shows a flowchart of the procedure for identifying a telephone conference identifier in the flowchart of FIGS. 15A-15B. In FIG. 16, the system can identify a telephone conference identifier either by syntactically parsing the message (as shown in block 1605), or by accessing the telephone conference identifier from a telephone conference identifier field in the message (as shown in block 1610).

Figure 17:
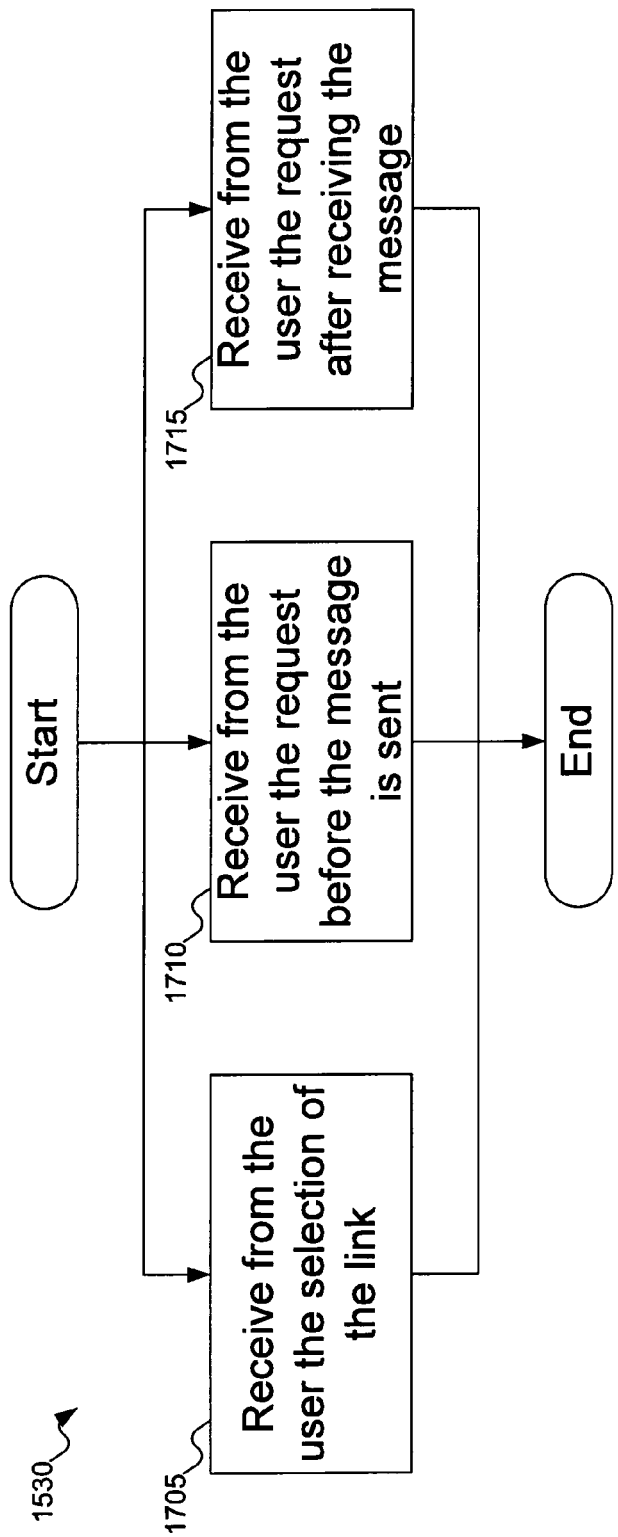
FIG. 17 shows a flowchart of the procedure for receiving a request to validate a telephone conference identifier.

FIG. 17 shows a flowchart of the procedure for receiving a request to validate a telephone conference identifier. In FIG. 17, the system can receive from the user a request to validate a telephone conference identifier in several different ways. For example, in block 1705, the system can receive from the user's selection of a link, such as a hyperlink marking the telephone conference identifier (as might be provided in block 1515 of FIG. 15A). Alternatively, in block 1710, the system can receive from the user a request to validate the telephone conference identifier before the message is sent. This might occur, for example, if the person arranging the telephone conference wanted to validate the telephone conference identifier before sending the telephone conference identifier to the other participants in the telephone conference. Alternatively, in block 1715, the system can receive from the user a request to validate the telephone conference identifier after the user receives the message. This might occur, for example, if one of the participants in the telephone conference, upon receiving the message from the person who arranged at the telephone conference, wanted to validate the telephone conference identifier for himself.

Figure 18A:
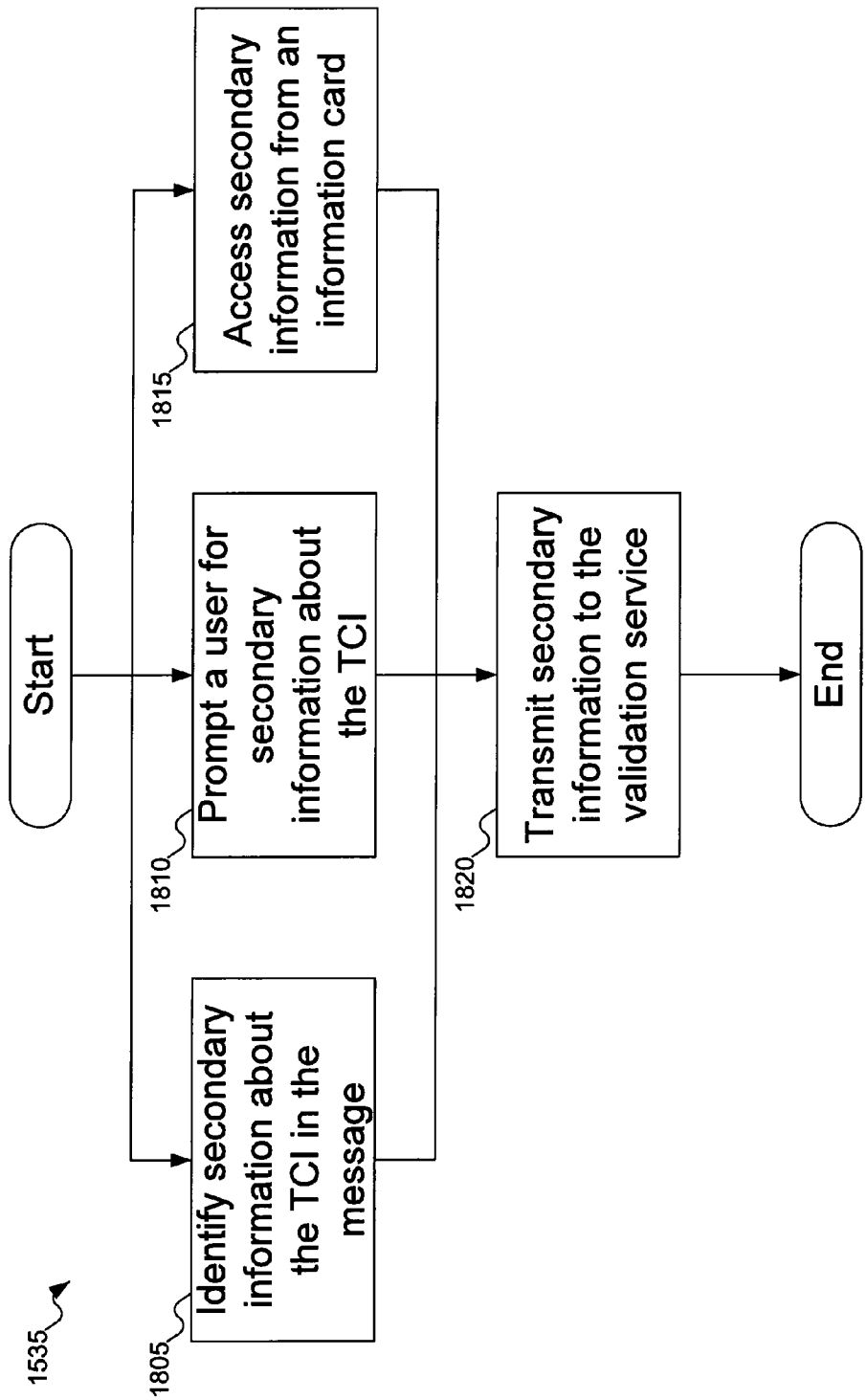
FIG. 18A shows a flowchart of the procedure for transmitting secondary information about a telephone conference to the validation service.

FIG. 18A shows a flowchart of the procedure for transmitting secondary information about a telephone conference to the validation service. In FIG. 18A, at block 1805, the system can identify secondary information about the telephone conference identifier in the message. Alternatively, at block 1810, the system can prompt the user for the secondary information about the telephone conference identifier. Alternatively, at block 1815, the system can access the secondary information from an information card. Information cards provide a mechanism by which one party (for example, a user) can engage in a transaction with another party (for example a merchant on the Internet), with the identity of the user being verified to the merchant via an identity provider. More details about information cards can be found, for example, in co-pending U.S. patent application Ser. No. 11/843,572, titled "PERFORMING A BUSINESS TRANSACTION WITHOUT DISCLOSING SENSITIVE IDENTITY INFORMATION TO A RELYING PARTY", filed Aug. 22, 2007, U.S. patent application Ser. No. 11/843,638, titled "POLICY-BASED AUDITING OF IDENTITY CREDENTIAL DISCLOSURE BY A SECURE TOKEN SERVICE", filed Aug. 22, 2007, and U.S. patent application Ser. No. 11/843,630, titled "FRAMEWORK AND TECHNOLOGY TO ENABLE THE PORTABILITY OF INFORMATION CARDS", filed Aug. 22, 2007, all incorporated by reference herein.

Regardless of the source of the secondary information, at block 1820, the secondary information is transmitted to the validation service. This enables the validation service to use the secondary information in validating the telephone conference identifier.

Figure 18B:
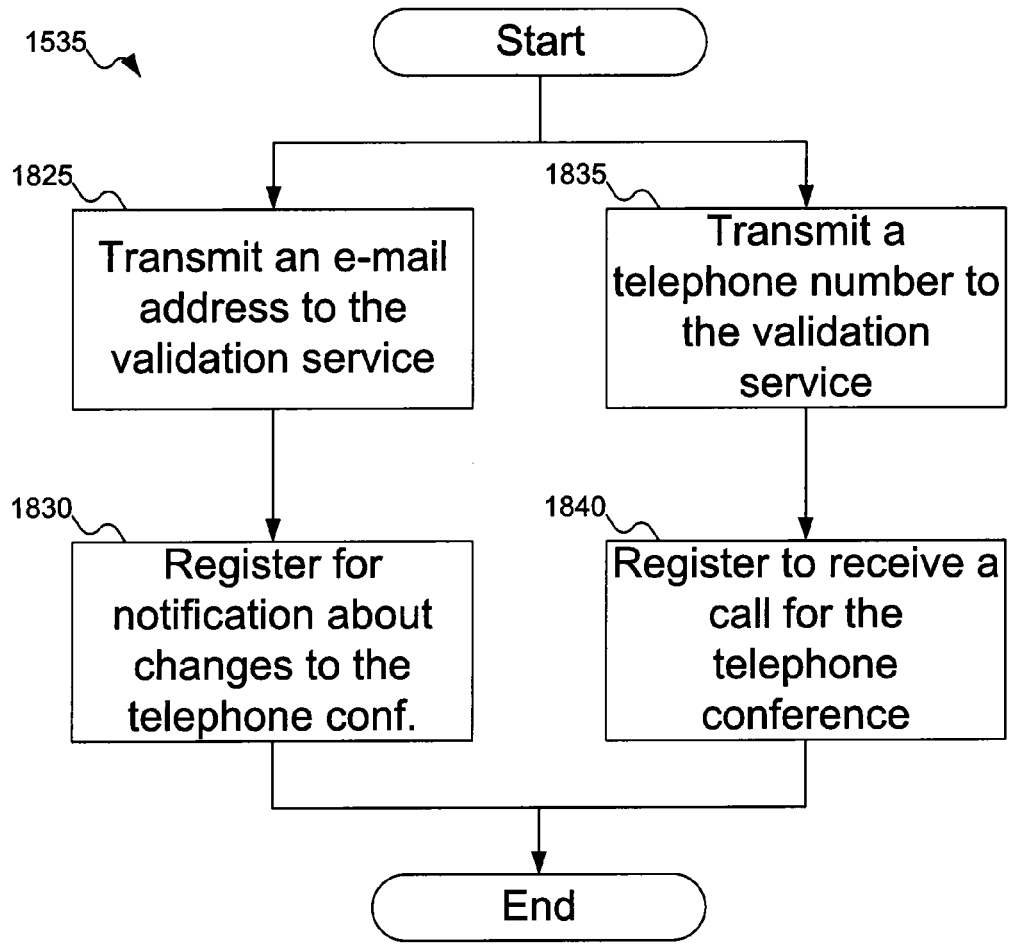
FIG. 18B shows a flowchart of the procedure for registering a user for notifications and calls.

FIG. 18B shows a flowchart of the procedure for registering a user for notifications and calls. In FIG. 18B, at block 1825, the system transmits an e-mail address to the validation service. At block 1830, the validation service can register the user for notification about changes to the telephone conference, and can e-mail the user at the provided e-mail address with notices about changes. Alternatively, at block 1835, the system can transmit a telephone number to the validation service. And that block 1840, the validation service can register the user for a callback at the time of the telephone conference. As discussed above with reference to FIG. 7, although FIG. 18B shows a user registering an e-mail address for notifications and a telephone number for callbacks, a person skilled in the art will recognize that registration can use any means to contact the user, without necessarily being limited to e-mails for changes and telephone calls for callbacks.

Figure 19A:
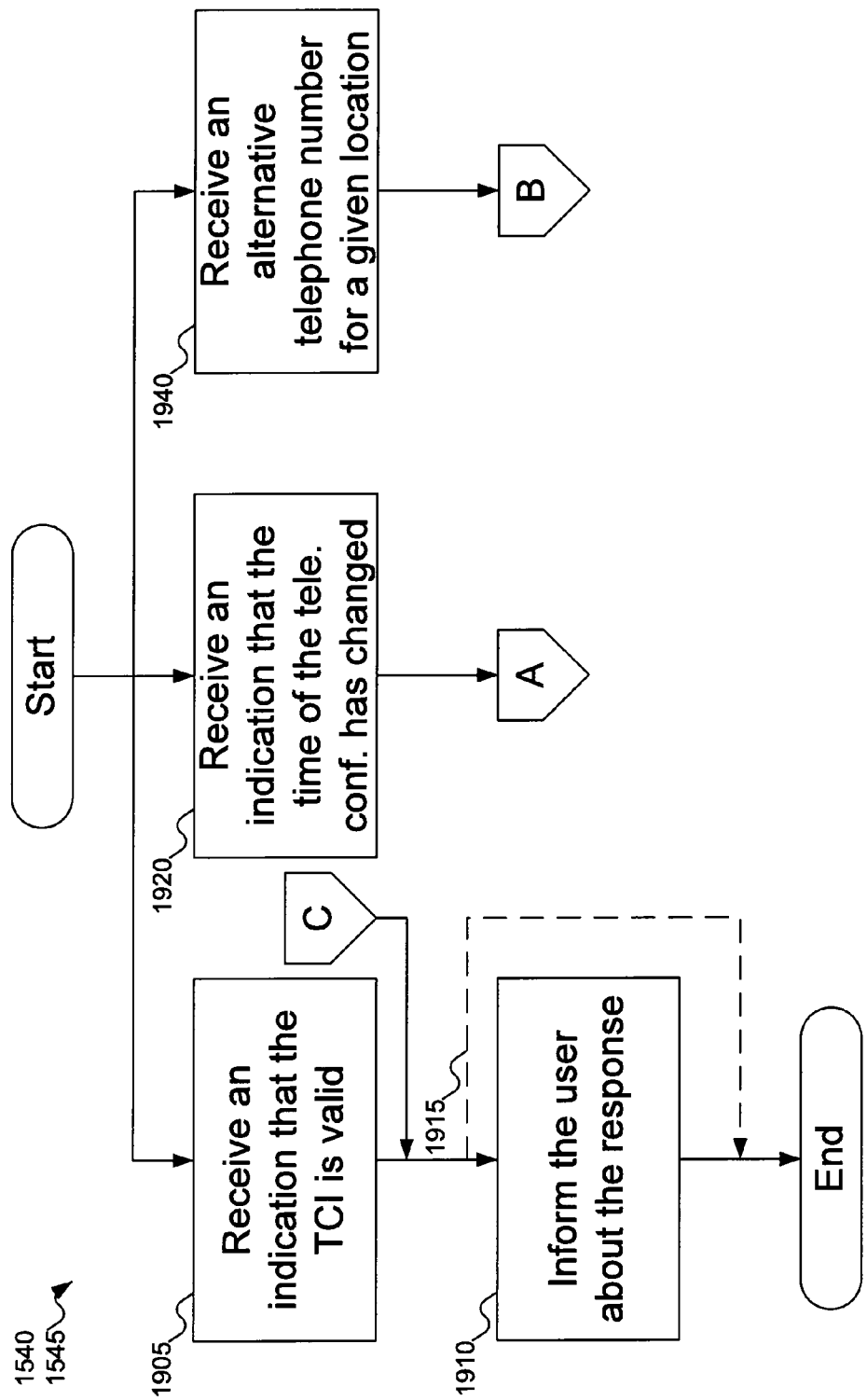
FIGS. 19A-19B show a flowchart of the procedure to process a response from the validation service.
Figure 19B:
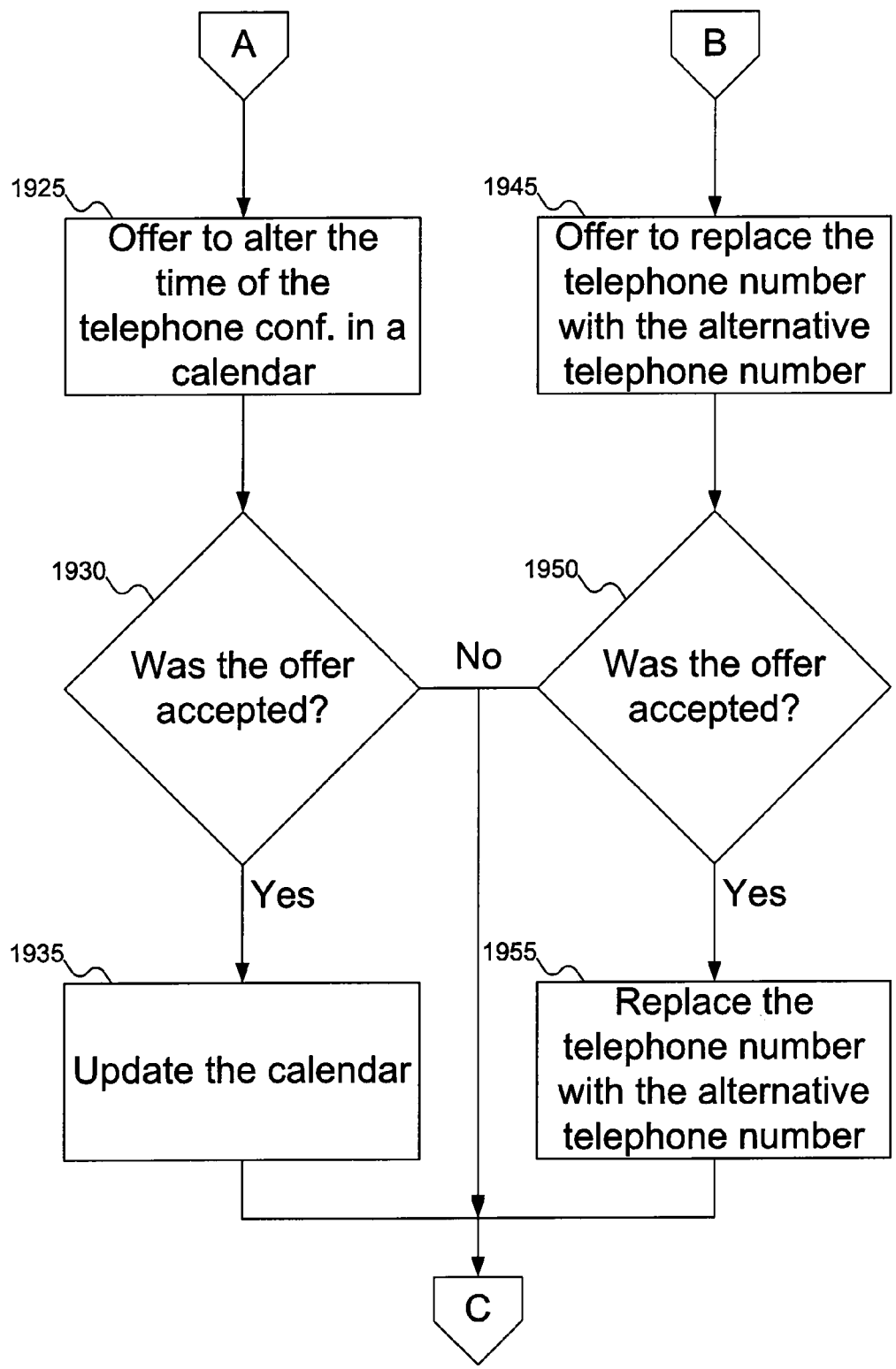

FIGS. 19A-19B show a flowchart of the procedure to process a response from the validation service. At block 1905, the system can receive from the validation service a response indicating that the telephone conference identifier is valid. Then, at block 1910, the system can inform the user about the response. As shown by dashed line 1915, block 1910 can be omitted.

Alternatively, at block 1920, the system can receive from the validation service an indication that the time of the telephone conference has changed. This indication can be received either as a direct response to a request to validate a telephone conference identifier, or as a result of the user registering for notification about any changes to the telephone conference (as discussed above with reference to FIGS. 6-8, 11-13, and 18B). In that case, at block 1925 (on FIG. 19B), the system can offer to alter the time of the telephone conference in a scheduled appointment on the user's calendar. If, at block 1930, the user accepts the offer, then at block 1935, the system updates the user's calendar. Processing then continues with optional block 1910 (on FIG. 19A).

Alternatively, at block 1940 (on FIG. 19A), the system can receive an alternative telephone number for accessing the telephone conference at a given location. In that case, at block 1945 (on FIG. 19B), the system can offer to replace the original telephone number in the telephone conference identifier with the alternative telephone number. If, at block 1950, the user accepts the offer, then at block 1955, the system replaces the telephone number in the telephone conference identifier with the alternative telephone number. Processing then continues with optional block 1910 (on FIG. 19A).

Figure 20:
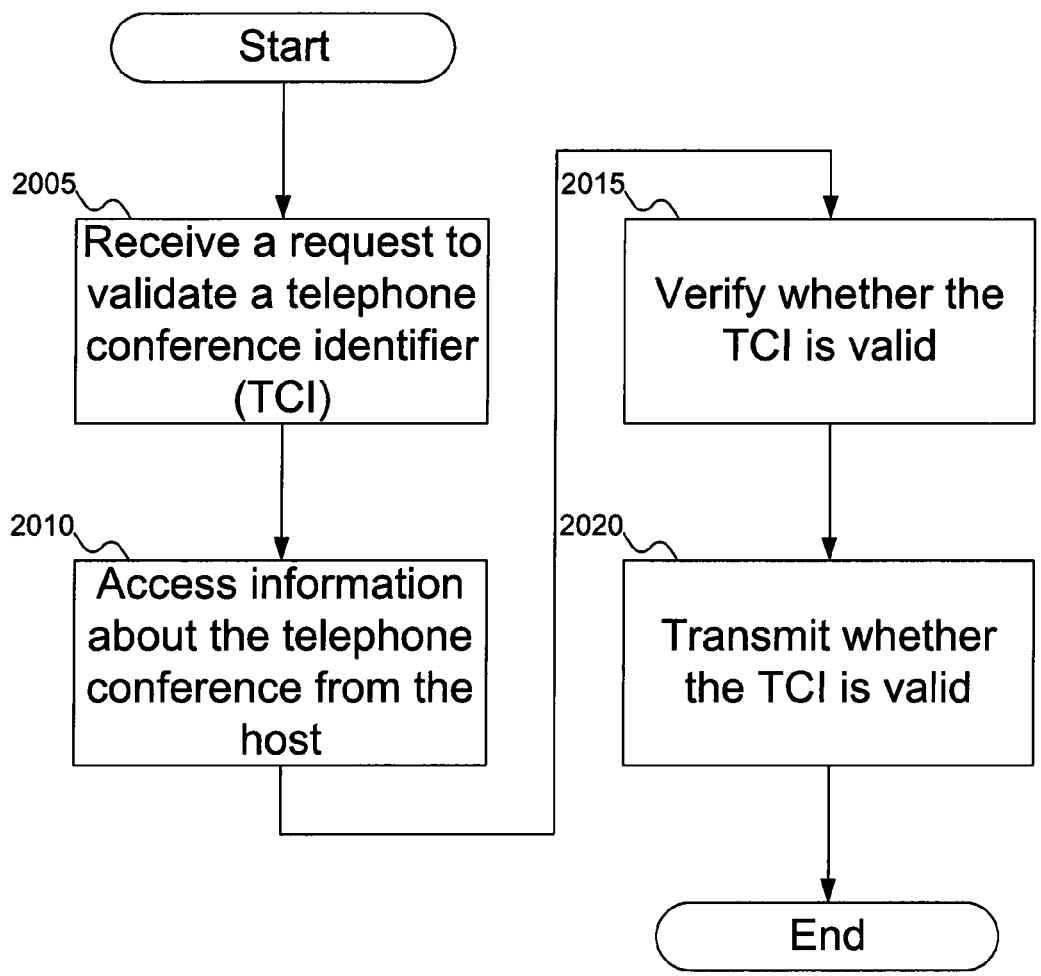
FIG. 20 shows a flowchart of the procedure for the validation service of FIG. 3 to validate a telephone conference identifier.

FIG. 20 shows a flowchart of the procedure for the validation service of FIG. 3 to validate a telephone conference identifier. At block 2005, the validation service receives a request to validate a telephone conference identifier. At block 2010, the validation service accesses information about the telephone conference from the host of the telephone conference. At block 2015, the validation service verifies whether or not the telephone conference identifier is valid. Finally, in block 2020, the validation service transmits whether the telephone conference identifier is valid.

Figure 21A:
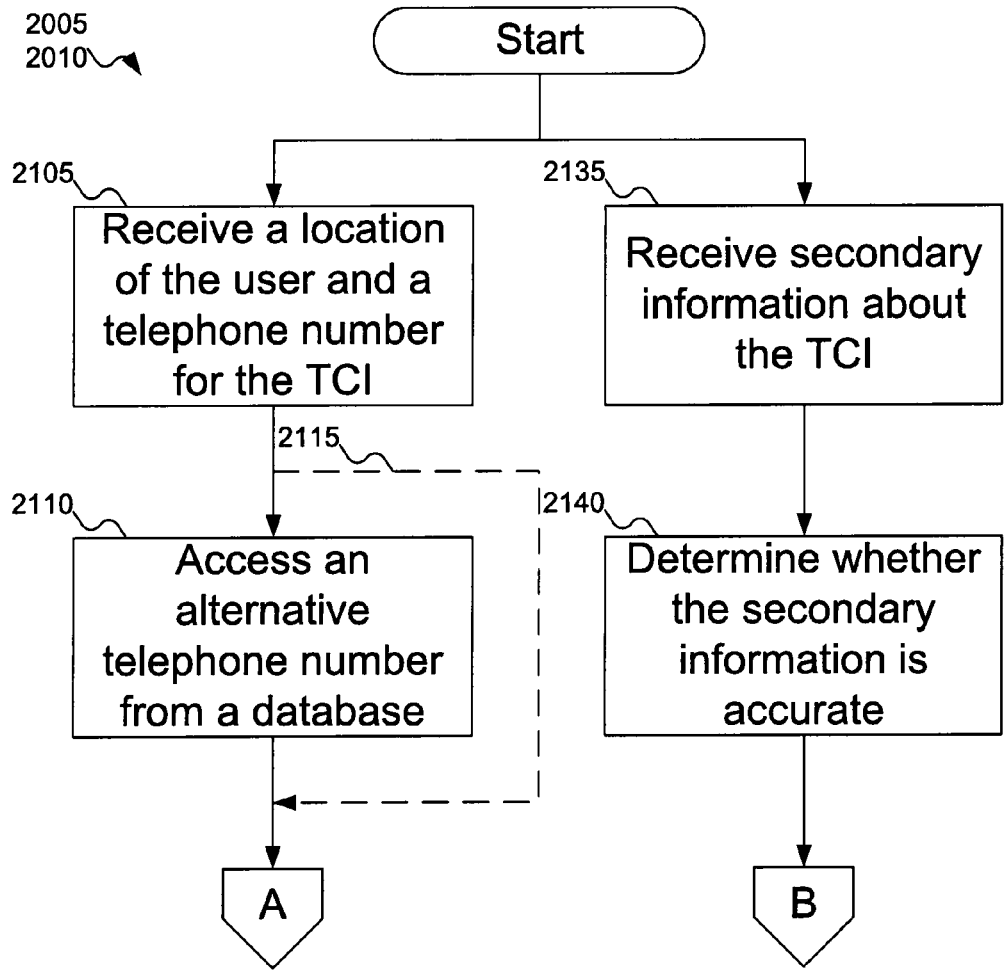
FIGS. 21A-21B show a flowchart of the procedure for the validation service to process secondary information about a telephone conference.
Figure 21B:
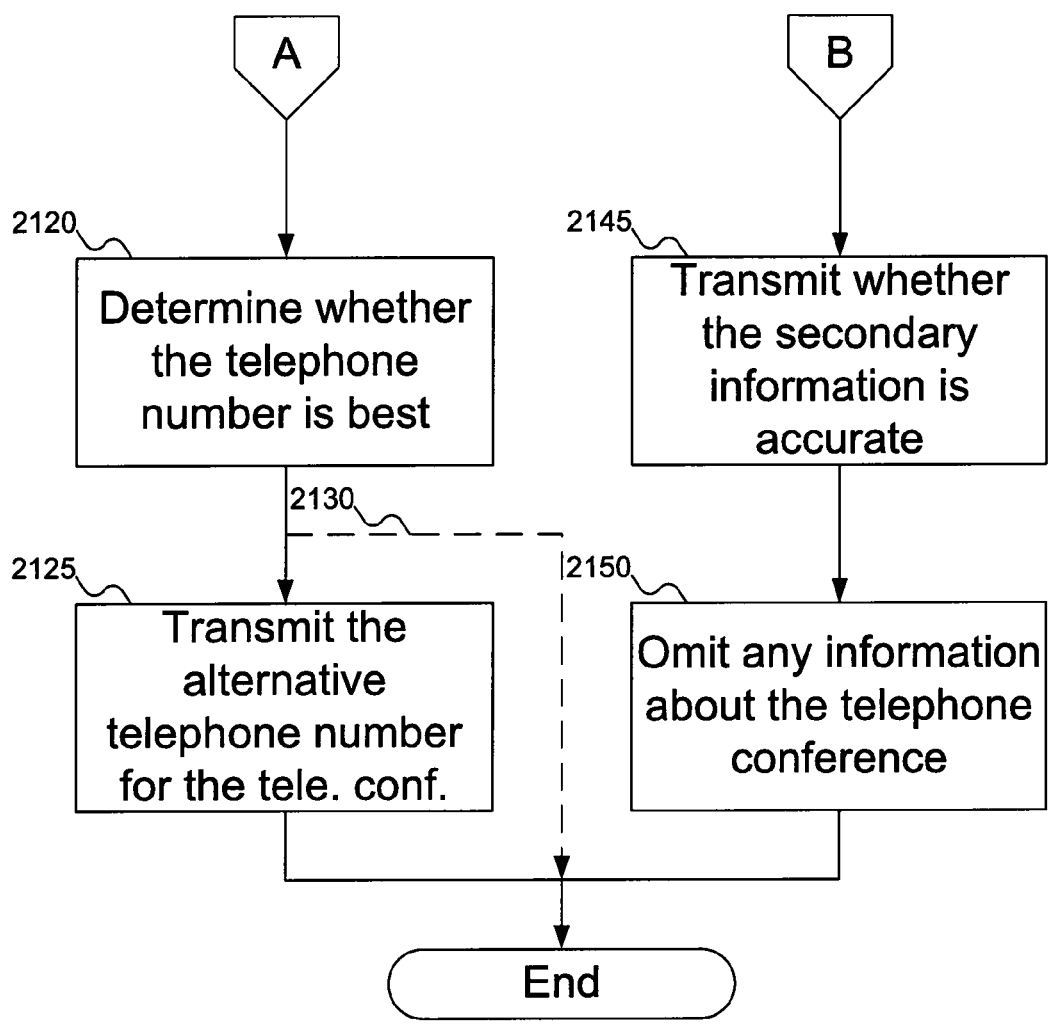

FIGS. 21A-21B show a flowchart of the procedure for the validation service to process secondary information about a telephone conference. In FIG. 21A, at block 2105, the validation service receives the location of the user and the telephone number in the telephone conference identifier. At block 2110, the validation service accesses an alternative telephone number from a database of alternative telephone numbers. As shown by dashed line 2115, block 2110 can be omitted (for example, the validation service might determine whether the telephone number included in the telephone conference identifier is the best telephone number for the user to use, but the validation service might not provide an alternative ("better") telephone number). At block 2120 (on FIG. 21B), the validation service determines whether the telephone number included in the telephone conference identifier is the best telephone number to use for the user given the user's expected location at the time of the telephone conference. Finally, at block 2125, if the alternative telephone number for the telephone conference is "better" for the user to use, the validation service transmits the alternative telephone number to the user. As shown by dashed line 2130, block 2125 can be omitted.

Alternatively, at block 2135 (on FIG. 21A), the validation service receives secondary information about the telephone conference identifier in the request to validate the telephone conference identifier. At block 2140, the validation service determines whether the secondary information provided in the request to validate the telephone conference identifier is accurate. At block 2145 (on FIG. 21B), the validation service transmits whether the secondary information is accurate. As part of this response, in block 2150, the validation service can omit any information about the telephone conference: i.e., the validation service can simply indicate whether the secondary information is accurate without revealing any information about the telephone conference.

Figure 22:
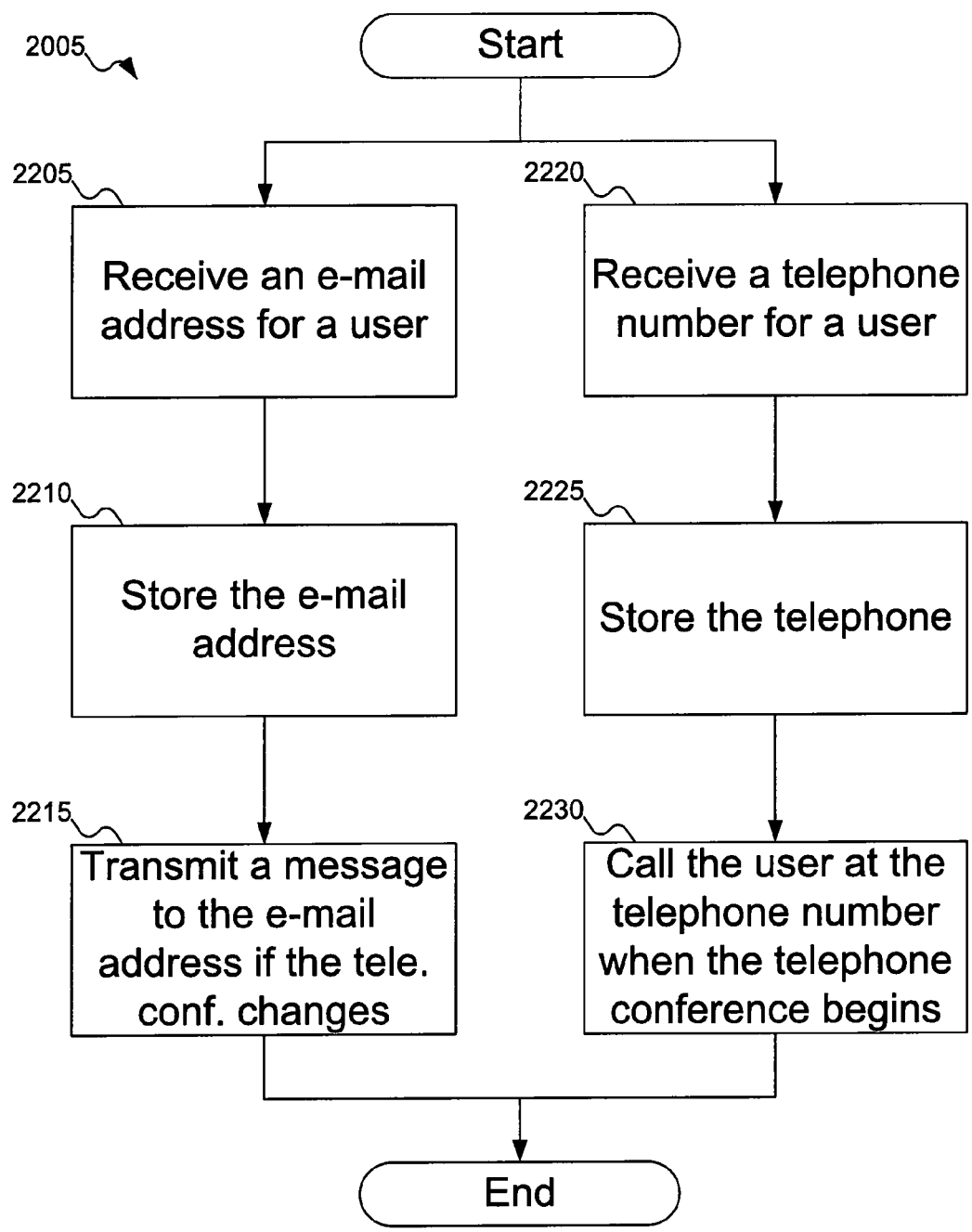
FIG. 22 shows a flowchart of the procedure for registering a user for notifications and calls.

FIG. 22 shows a flowchart of the procedure for registering a user for notifications and calls. At block 2205, the validation service receives from the user and e-mail address. At block 2210, the validation service stores e-mail address. At block 2215, upon their being any change to the telephone conference, the validation service transmits a message to the user at the provided e-mail address.

Alternatively, block 2220, the validation service receives from the user a telephone number. At block 2225, the system stores telephone number. At block 2230, at the time the telephone conference is scheduled to begin, the telephone conference host can initiate a callback of the user at the stored telephone number.

Figure 23:
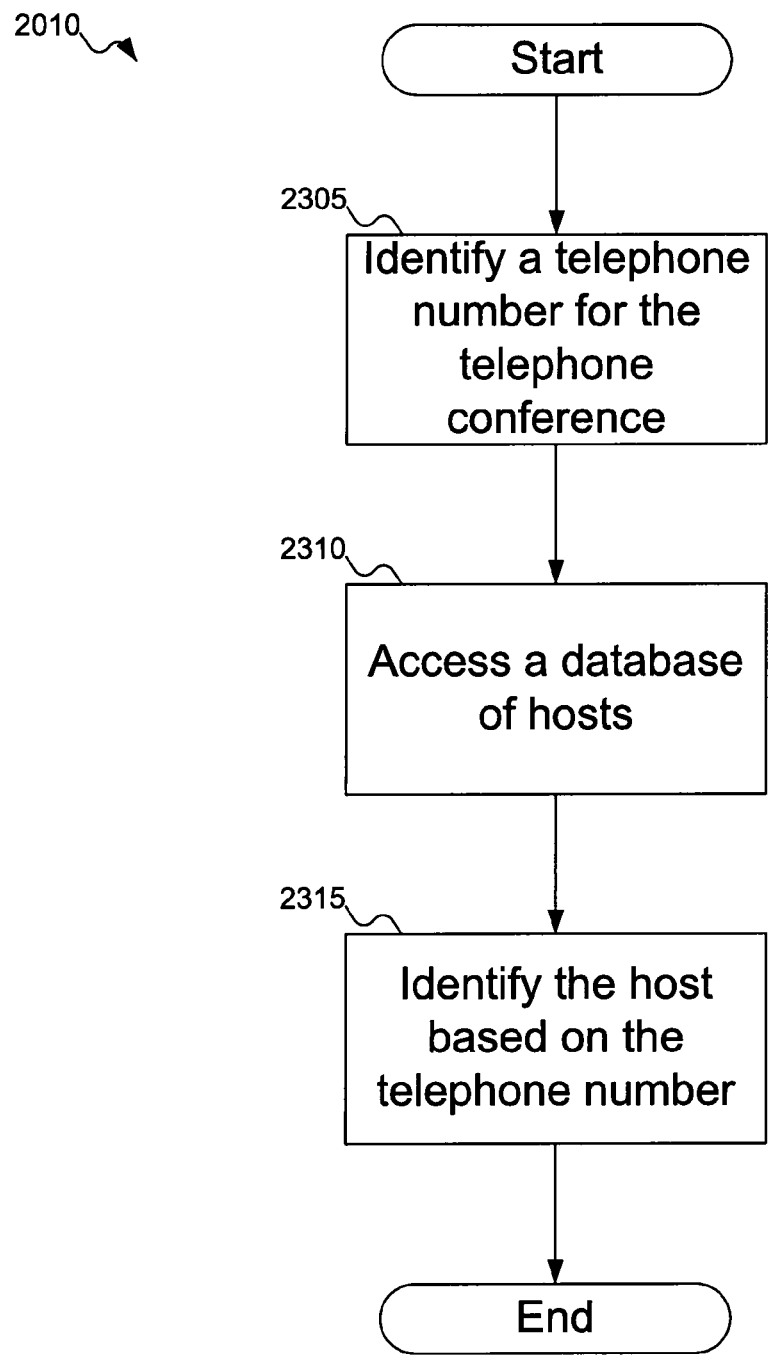
FIG. 23 shows a flowchart of the procedure for identifying a host of a telephone conference.

FIG. 23 shows a flowchart of the procedure for identifying a host of a telephone conference. At block 2305, the validation service identifies a telephone number in the telephone conference identifier. At block 2310, the validation service accesses a database of telephone conference hosts. At block 2315, using the telephone number from a telephone conference identifier and the database of telephone conference hosts, the validation service identifies the host of the telephone conference. This enables the validation service to access the telephone conference identifier database for that host.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. When accessed from the storage media, a machine can execute the associated data. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

The invention claimed is:

1. An apparatus, comprising:
a machine (105, 305);
a database (315) of telephone conference identifiers (525);
a receiver (320) on the machine (105, 305) to receive from a second machine (205, 505) a request (605, 615) to validate a telephone conference identifier (525) identifying a telephone conference;
a validator (325) to validate said telephone conference identifier (525) against the database (315) of telephone conference identifiers (525) to produce a response (610, 620); and
a transmitter (330) to transmit to said second machine (205, 505) said response (610, 620) from the validator (325).

2. An apparatus according to claim 1, wherein:
the apparatus further comprises:
a second database (1305) of alternative telephone numbers (1205, 1210) that the user can use to call into said telephone conference; and
a location identifier (1310) to identify a location (1215) of a user from said telephone conference identifier (525); and
the validator (325) is operative to select an alternative telephone number (1205, 1210) from the second database (1305) based on said location (1215) of said user.

3. An apparatus according to claim 1, wherein:
the database (315) of telephone conference identifiers (525) includes information (1405, 1410, 1415, 1420) about at least one telephone conference;
the receiver (320) is operative to receive secondary information (1010) in said request (605, 615); and
the validator (325) is operative to compare said secondary information (1010) in said request (605, 615) with said information (1405, 1410, 1415, 1420) in the database (315).

4. An apparatus according to claim 3, wherein the validator (325) is operative to indicate whether said secondary information (1010) in said request (605, 615) conflicts with said information (1405, 1410, 1415, 1420) in the database (315) without providing any of said information (1405, 1410, 1415, 1420) in the database (315).

5. An apparatus according to claim 1, further comprising a second database (1315) of registered users.

6. An apparatus according to claim 5, wherein:
said request (605, 615) includes an e-mail address (710) for a user;
the validator (325) is operative to store said e-mail address (710) for said user in the second database (1315) of registered users; and
the apparatus further comprises a notifier (1320) to e-mail said user at said e-mail address (710) if a time of said telephone conference changes.

7. An apparatus according to claim 5, wherein:
said request (605, 615) includes a telephone number (720) for a user;
the validator (325) is operative to store said telephone number (720) for said user in the second database (1315) of registered users; and
the apparatus further comprises a dialer (1325) to call said user at said telephone number (720) at a time of said telephone conference.

8. An apparatus according to claim 1, wherein:
the database (315) of telephone conference identifiers (525) is stored at a host (105) of said telephone conference;
the apparatus further comprises a second database (405) of hosts; and
the validator (325) is operative to use a telephone number (515) in said telephone conference identifier (525) and the second database (405) to identify the host (105) of said telephone conference to locate the database (315) of telephone conference identifiers (525).

9. An apparatus according to claim 1, further comprising:
a telephone conference identifier device (230) on said second machine (205, 505) to identify said telephone conference identifier (525) in a message (510);
a second transmitter (235) on said second machine (205, 505) to transmit to the machine (105, 305) said request (605, 615) to validate said telephone conference identifier (525);
a second receiver (240) on said second machine (205, 505) to receive from said validation service (310) said response (610, 620); and
a processor (245) on said second machine (205, 505) to process said response (610, 620).

10. A method, comprising:
receiving (2005) at a machine a request (605, 615) to validate a telephone conference identifier (525) identifying a telephone conference;
accessing (2010) information (1405, 1410, 1415, 1420) about the telephone conference from a host (105) of the telephone conference responsive to the request (605, 615) to validate a telephone conference identifier (525);
verifying (2015) whether the telephone conference identifier (525) is consistent with the information (1405, 1410, 1415, 1420) about the telephone conference; and
transmitting (2020) whether the telephone conference identifier (525) is valid.

11. A method according to claim 10, wherein:
receiving (2005) a request (605, 615) to validate a telephone conference identifier (525) includes receiving (2105) a location (1215) of a user and a telephone number (515); and
verifying (2015) whether the telephone conference identifier (525) is consistent with the information (1405, 1410, 1415, 1420) about the telephone conference includes determining (2120) whether the telephone number (515) is the best way for the user to access the telephone conference from the location (1215).

12. A method according to claim 11, wherein verifying (2015) whether the telephone conference identifier (525) is consistent with the information (1405, 1410, 1415, 1420) about the telephone conference further includes transmitting (2125) an alternative telephone number (1205, 1210) to access the telephone conference from the location (1215).

13. A method according to claim 12, wherein determining (2120) whether the telephone number (515) is the best way for the user to access the telephone conference from the location (1215) includes accessing (2110) the alternative telephone number (1205, 1210) from a database (1305) of alternative telephone numbers (1205, 1210) from the host (105) of the telephone conference.

14. A method according to claim 10, wherein:
receiving (2005) a request (605, 615) to validate a telephone conference identifier (525) includes receiving (2135) secondary information (1010) about the telephone conference; and
verifying (2015) whether the telephone conference identifier (525) is consistent with the information (1405, 1410, 1415, 1420) about the telephone conference includes determining (2140) whether the secondary information (1010) is consistent with the information (1405, 1410, 1415, 1420) about the telephone conference.

15. A method according to claim 14, further comprising if the secondary information (1010) is not consistent with the information (1405, 1410, 1415, 1420) about the telephone conference, transmitting (2145, 2150) that the secondary information (1010) is not consistent with the information (1405, 1410, 1415, 1420) about the telephone conference without transmitting the information (1405, 1410, 1415, 1420) about the telephone conference.

16. A method according to claim 10, wherein:
receiving (2155) a request (605, 615) to validate a telephone conference identifier (525) identifying a telephone conference includes receiving (2205) an e-mail address (710) for a user; and
the method further comprises:
storing (2210) the e-mail address (710) for the user; and
transmitting (2215) a message (510) to the e-mail address (710) for the user if a time for the telephone conference changes.

17. A method according to claim 10, wherein:
receiving (2005) a request (605, 615) to validate a telephone conference identifier (525) identifying a telephone conference includes receiving (2220) a telephone number (720) for a user; and
the method further comprises:
storing (2225) the telephone number (720) for the user; and
calling (2230) the user at the telephone number (720) at a time for the telephone conference.

18. A method according to claim 10, further comprising:
transmitting (1535) from a machine (205, 505) to a validation service (310) the request (605, 615) to validate the telephone conference identifier (525);
receiving (1540) at the machine (205, 505) from the validation service (310) the response (610, 620); and
processing (1545) the response (610, 620) at the machine (205, 505).

19. An article, comprising a non-transitory storage medium, said non-transitory storage medium having stored thereon instructions that, when executed by a machine, result in:
receiving (2005) a request (605, 615) to validate a telephone conference identifier (525) identifying a telephone conference;
accessing (2010) information (1405, 1410, 1415, 1420) about the telephone conference from a host (105) of the telephone conference responsive to the request (605, 615) to validate a telephone conference identifier (525);
verifying (2015) whether the telephone conference identifier (525) is consistent with the information (1405, 1410, 1415, 1420) about the telephone conference; and
transmitting (2020) whether the telephone conference identifier (525) is valid.

20. An article according to claim 19, wherein:
receiving (2005) a request (605, 615) to validate a telephone conference identifier (525) includes receiving (2105) a location (1215) of a user and a telephone number (515); and
verifying (2015) whether the telephone conference identifier (525) is consistent with the information (1405, 1410, 1415, 1420) about the telephone conference includes determining (2120) whether the telephone number (515) is the best way for the user to access the telephone conference from the location (1215).

21. An article according to claim 19, wherein:
receiving (2005) a request (605, 615) to validate a telephone conference identifier (525) includes receiving (2135) secondary information (1010) about the telephone conference; and
verifying (2015) whether the telephone conference identifier (525) is consistent with the information (1405, 1410, 1415, 1420) about the telephone conference includes determining (2140) whether the secondary information (1010) is consistent with the information (1405, 1410, 1415, 1420) about the telephone conference.

22. An article according to claim 19, wherein accessing (2010) information (1405, 1410, 1415) about the telephone conference from a host (105) of the telephone conference includes identifying (2315) the host (105) of the telephone conference using a telephone number (515) in the telephone conference identifier (525).

* * * * *